(12) United States Patent
Milne et al.

(10) Patent No.: US 9,307,298 B2
(45) Date of Patent: Apr. 5, 2016

(54) SYSTEM AND METHOD FOR VIDEO STATISTICAL MULTIPLEXING ADAPTING TO INTERNET PROTOCOL NETWORKS

(75) Inventors: Mike Milne, Discovery Bay, CA (US); Shahab Hamidi-Rad, Sunnyvale, CA (US); Dror Levin, San Jose, CA (US)

(73) Assignee: Harmonic, Inc., San Jose, CA (US)

( * ) Notice: Subject to any disclaimer, the term of this patent is extended or adjusted under 35 U.S.C. 154(b) by 574 days.

(21) Appl. No.: 13/203,458

(22) PCT Filed: May 28, 2010

(86) PCT No.: PCT/US2010/036727
§ 371 (c)(1),
(2), (4) Date: Aug. 25, 2011

(87) PCT Pub. No.: WO2010/138913
PCT Pub. Date: Dec. 2, 2010

(65) Prior Publication Data
US 2012/0005716 A1    Jan. 5, 2012

Related U.S. Application Data

(60) Provisional application No. 61/182,659, filed on May 29, 2009.

(51) Int. Cl.
*H04N 7/16*       (2011.01)
*H04N 21/647*   (2011.01)
(Continued)

(52) U.S. Cl.
CPC ....... *H04N 21/64761* (2013.01); *H04N 19/102* (2014.11); *H04N 19/172* (2014.11);
(Continued)

(58) Field of Classification Search
CPC .......... H04N 21/478; H04N 21/26291; H04N 21/8355; H04N 21/4622; H04N 21/643; H04N 21/6338; H04N 21/23655; H04N 21/64761
USPC .......... 370/231, 249, 516; 725/148, 136, 118, 725/143, 54, 109, 98
See application file for complete search history.

(56) References Cited

U.S. PATENT DOCUMENTS

| 5,861,919 A | 1/1999 | Perkins et al. |
| 6,094,457 A | 7/2000 | Linzer et al. |

(Continued)

FOREIGN PATENT DOCUMENTS

WO    WO2009008829 A1 *   1/2009   ............... H04L 12/56

*Primary Examiner* — Nasser Goodarzi
*Assistant Examiner* — An Nguyen
(74) *Attorney, Agent, or Firm* — Brokaw Patent Law P.C.; Christopher J. Brokaw

(57) ABSTRACT

The present invention discloses methods and systems of statistical video multiplexing to improve the performance of video encoding by minimizing delay while achieving high video quality. The video encoders used in the system are capable of calculating the complexity of underlying video sources and communicating the complexity to the multiplexer. Furthermore, the video encoders are capable of estimating the look-ahead complexity, i.e. the future complexity and communicating the future complexity values to the multiplexer. A processor associated with the multiplexer allocates bit rates for the video encoders according to the received complexity values and future complexity values. The bit rate information is then communicated to the video encoders. Each video encoder will then exercise its coding control parameters to regulate the resulting bit rate to be within or close to the allocated bit rate.

22 Claims, 18 Drawing Sheets

(51) Int. Cl.
*H04N 21/2365* (2011.01)
*H04N 21/6338* (2011.01)
*H04N 21/643* (2011.01)
*H04N 19/172* (2014.01)
*H04N 19/46* (2014.01)
*H04N 19/102* (2014.01)
*H04N 19/61* (2014.01)
*H04L 29/06* (2006.01)

(52) U.S. Cl.
CPC ............ *H04N 19/46* (2014.11); *H04N 19/61* (2014.11); *H04N 21/23655* (2013.01); *H04N 21/6338* (2013.01); *H04N 21/643* (2013.01); *H04L 65/607* (2013.01); *H04L 65/80* (2013.01)

(56) References Cited

U.S. PATENT DOCUMENTS

| | | | |
|---|---|---|---|
| 6,665,872 B1 * | 12/2003 | Krishnamurthy et al. ...... 725/95 |
| 6,674,796 B1 | 1/2004 | Haskell et al. | |
| 7,418,007 B1 | 8/2008 | Liu et al. | |
| 7,486,680 B1 * | 2/2009 | Zhang et al. ................ 370/395.4 |
| 7,529,276 B1 * | 5/2009 | Ramakrishnan . H04N 21/23406 370/412 |
| 7,652,993 B2 * | 1/2010 | van Beek .......... H04N 21/23406 370/231 |
| 2003/0046431 A1 * | 3/2003 | Belleguie ............. H04N 21/235 709/246 |
| 2003/0235247 A1 * | 12/2003 | Wu et al. ................... 375/240.03 |
| 2004/0233998 A1 * | 11/2004 | Wu et al. ................... 375/240.29 |
| 2006/0045020 A1 * | 3/2006 | Picco .................... H04J 3/0682 370/249 |
| 2007/0177677 A1 * | 8/2007 | Thomsen ................. 375/240.26 |
| 2008/0273504 A1 * | 11/2008 | Foley ...................... H04L 12/66 370/337 |
| 2009/0046593 A1 * | 2/2009 | Ptasinski ............... H04L 1/0003 370/252 |
| 2009/0285217 A1 * | 11/2009 | Frink ....................... H04N 7/52 370/394 |

\* cited by examiner

SYSTEM AND METHOD FOR VIDEO STATISTICAL MULTIPLEXING ADAPTING TO INTERNET PROTOCOL NETWORKS

RELATED APPLICATION

This application claims the priority benefit of U.S. Provisional Patent Application No. 61/182,659, "Systems and Methods for Video Statistical Multiplexing Adapting to Internet Protocol Networks", filed May 29, 2009, the disclosure of which is incorporated by reference herein.

TECHNICAL FIELD

The invention relates to the field of digital video transmission. More particularly the invention relates to methods and systems of statistical video multiplexing adapted to Internet protocol networks.

BACKGROUND

Digital video multiplexing allows multiple encoded video bitstreams to be transmitted on a common digital channel. Concatenating a large amount of data on a safe channel has its benefits, but also presents significant challenges. Due to the inherent characteristics of video content, the bit rate of video data fluctuates. Video content with complex scenes and frequent motion has higher bit rates, whereas videos with simpler scenes have lower bit rates. However, the transmission channel often has a fixed bandwidth or fixed allocated bandwidth for a period of time. Consequently, if the total bit rate exceeds the available channel bandwidth, some of the encoded data is dropped or delayed for later transmission. This results in video quality degradation due to repeated drops and delays of encoded data. Video statistical multiplexing is a technique that takes the advantage of the statistical nature of unrelated video sources to improve video quality. For unrelated video sources, different sources will not always generate high bit rates or low bit rates at the same time. From a mathematical perspective, the aggregated bit rate will statistically have a bell shaped probability distribution curve with a mean bit rate and a variance. When the number of video sources increases, the normalized variance becomes smaller. The aggregated bit rate is thus more "predictable" or "stable" for a larger number of video sources. As a result, the likelihood that the aggregated bit rate will exceed the channel bandwidth decreases. While the video source is addressed herein, video streams are accompanied by associated audio content that is transmitted synchronously. Audio content is often compressed using constant bit rate (CBR) coding or variable bit rate (VBR) coding. The quantity of compressed audio data is usually smaller that that of video data.

For the sake of simplicity, only video data is specifically referred to herein. However, it is understood that video data may include associated audio data. In addition, the terms "bitrate", "bit rate" and "rate" are often used interchangeably in the art to refer to units of video data per unit of time. Other terms maybe used herein to refer to technical jargon and well known terms of art These terms are used for illustrations purposes.

While statistical video multiplexing takes advantage of the statistical behavior of underlying multiple video sources, the aggregated bit rate may still exceed the available bandwidth. In order to further improve video quality, the statistical video multiplexer can work in conjunction with the video encoders to reduce the aggregated bit rate to fit within the allocated overall bandwidth. The video statistical multiplexer may take a very conservative approach by allocating a relatively low bit rate to each encoder to reduce or duplicate data loss. In such a design, each encoder could use a coarse quantizer or other means to generate a compressed bit stream that fits within the allocated bit rate. As a consequence of the low bit rate, however, degradation in video quality may result. Those skilled in the art may adopt a general bit rate control strategy that allocates as high a bit rate as possible while keeping the aggregated bit rate within the allocated bandwidth.

If the multiplexer is located at a service head-end while the encoders are remotely located at different sites, the statistical video multiplexing is complicated by possible network delays between the multiplexer and encoders. Dynamic delay characteristics result when the multiplexer and video encoders are connected over internet protocol (IP) networks. In an IP network environment, packet delay can often occur during periods of high overall network traffic. To account for this effect, the multiplexer may use a simple approach by always assuming the greatest possible delay for all encoders. However, this simple approach unnecessarily introduces more delay in transmitting the underlying video data generated by the video encoders.

Therefore, there is a need for methods and systems of video multiplexing that minimize delay while maintaining optimal video quality. These methods and systems should take into account the dynamic delay characteristics of IP networking and provide an adaptive solution for the changing network environment. Furthermore, the methods and systems should provide a mechanism for the multiplexer to function properly during the transition from one network delay to another network delay.

DETAILED DESCRIPTION

Figure 1:
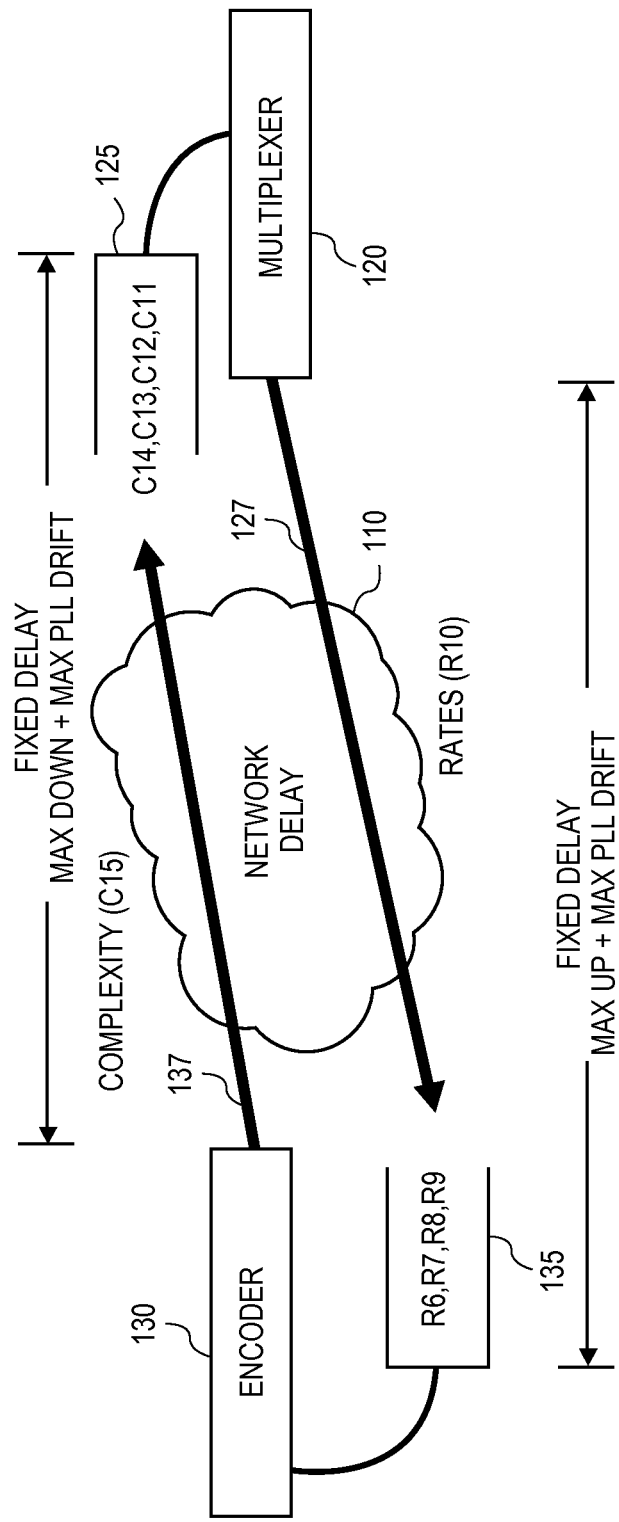
FIG. 1 shows a prior art video multiplexing system that always assumes the greatest possible network delay for all video encoders.

The present invention discloses methods and systems of statistical video multiplexing to improve performance by minimizing delay while maintaining high video quality. The video encoders used in the system are capable of calculating the complexity of underlying video sources and communicating said complexity to the multiplexer. Furthermore, the video encoders are capable of estimating the look-ahead complexity, i.e. the future complexity and communicating the future complexity values to the multiplexer. A processor associated with the multiplexer allocates bit rates for the video encoders according to the received complexity values and future complexity values. The bit rate information is then communicated to the video encoders. Each video encoder will then exercise its coding control parameters to regulate the resulting bit rate to be within or close to the allocated bit rate.

The present invention can be applied to IP networks where the network delay varies depending on the traffic levels. Generally, longer delays occur during periods of high traffic and shorter delays during periods of low traffic. The present invention utilizes a queue at each video encoder to buffer the bit rates received from the multiplexer and utilizes a queue at the multiplexer for each video encoder to buffer the complexity values received from the video encoder. A mechanism to accommodate the dynamic network delay is provided to detect the delay changes, whether increasing or decreasing, and to cause the video encoders and multiplexer to adjust accordingly. The video encoder will determine an index according to the buffer status for the complexity value to be generated, and generate a main complexity value associated with the complexity index. The multiplexer will monitor the status of the corresponding queue for the video encoder and determine the bit rate based on the main complexity value or the look-ahead complexity value.

In one embodiment of the present invention, the multiplexer receives a main complexity value and one or more look-ahead complexity values from the video encoder. The multiplexer then allocates bit rates for the video encoders according to the received main complexity values and the future complexity values and communicates said bit rates to the video encoders. The video encoder will use a bit rate buffer for storing bit rates and monitoring the status, and will determine the index for the complexity value according to the status of the bit rate buffer. The multiplexer will use a complexity buffer for storing main and look-ahead complexity values and monitoring the status, and will determine the bit rate based on either the main complexity value or one of the look-ahead complexity values according to the status of the complexity buffer.

Although the present invention has been described in terms of specific embodiments it is anticipated that alterations and modifications thereof will no doubt become apparent to those skilled in the art. It is therefore intended that the following claims be interpreted as covering all such alterations and modifications as fall within the true spirit and scope of the invention.

While "video" multiplexer and "video" encoders are referred to in the specification, it is understood that "video" is referring to video data as well as any associated audio data. The audio portion is not explicitly described. However, those skilled in the art can practice the present invention on video data having associated audio data. A conventional video multiplexing system is shown in FIG. 1 where the system always assumes all video encoders are continuously experiencing the worst possible network delay. While such an approach is simple in design, it unnecessarily introduces more delay, particularly to those video encoders that have shorter network delay. As shown in FIG. 1, the multiplexer 120 and the video encoder 130 are connected through a network cloud 110. Only one of the multiple video encoders is shown in the drawing. However, it is understood that there are more video encoders of similar structure, not shown in FIG. 1, connected to the multiplexer 120 through the network cloud 110. In this disclosure, the word "mux" may be used as an abbreviation for the multiplexer or the video multiplexer. Also the terms "multiplexer" and "video multiplexer" are used interchangeably in the disclosure. The multiplexer 120 and the encoder 130 can may be co-located at the same site or can may be far apart. For example, the multiplexer may be located at a cable head-end in New York city while the video encoder is located in Los Angeles. The video encoders need not be co-located and can be scattered around in various cities. Each video encoder has an associated buffer 135 to store the bit rates sent by the multiplexer 120 through a connection 127. The multiplexer also has a corresponding buffer 125 for each video encoder 130 to store the complexity values sent by the video encoder 130 through a connection 137.

The uplink delay is the delay from the multiplexer 120 to the video encoder 130 and the downlink delay is the delay from the video encoder 130 to the multiplexer 120. The delay model used by a conventional system always assumes the worst possible delay among all connections between the multiplexer and the video encoders. Additional delay is added to take into account the system clock drift. As a result, the system assumes fixed uplink and downlink delays where the uplink delay is the maximum uplink delay between the multiplexer and the video encoders plus the maximum system phase-lock-loop (PLL) clock drift and the downlink delay is the maximum downlink delay between the multiplexer and the video encoders plus the maximum system phase-lock-loop (PLL) clock drift. In one scenario where all video encoders are located in close proximity to the multiplexer except one which is very far away from the multiplexer, all video sources will be subject to long delay according to the delay.

Figure 2:
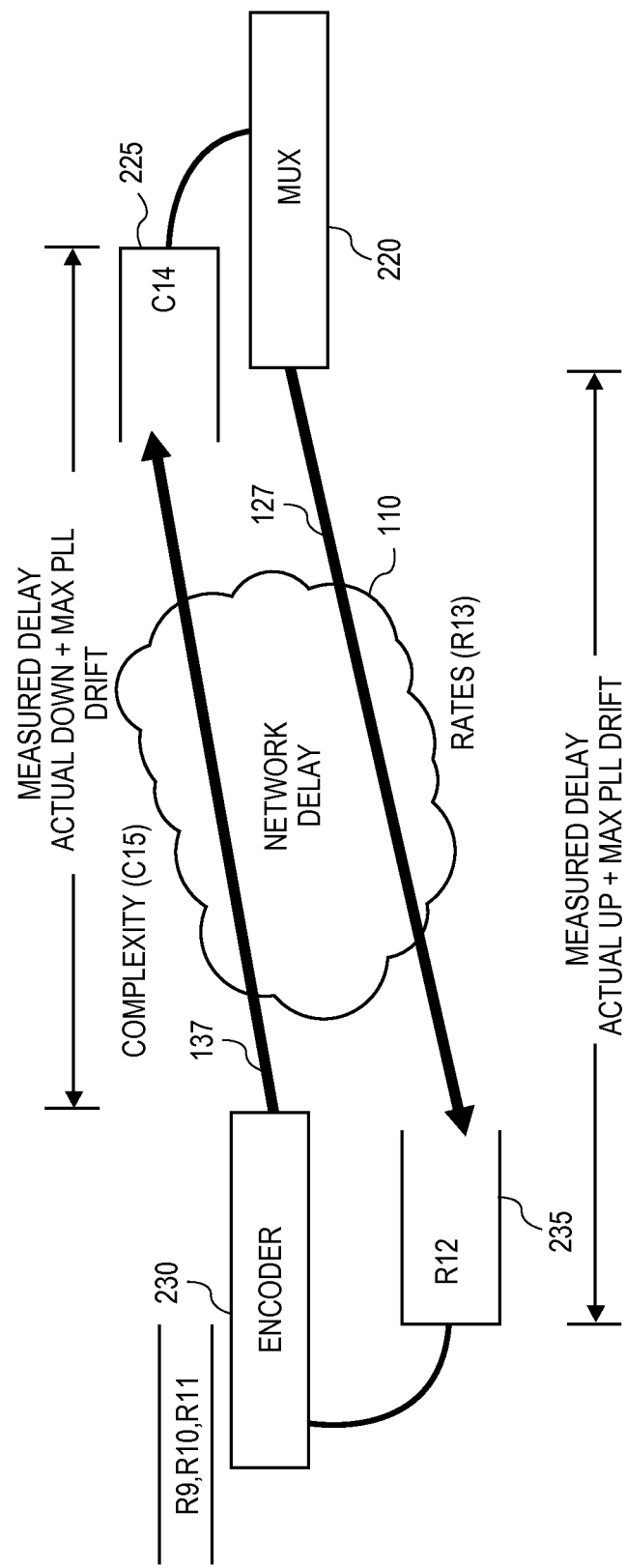
FIG. 2 shows a video multiplexing system embodying the present invention.

FIG. 2 shows a multiplexing system embodying the present invention where the buffer 225 in the multiplexer 220 and the buffer 235 associated with the encoder 230 are smaller. As a result, the video data delay is shorter than before. The system shown in FIG. 2 estimates the actual delay for uplink and downlink and the estimated actual network delays are used in the roundtrip communication.

Figure 3:
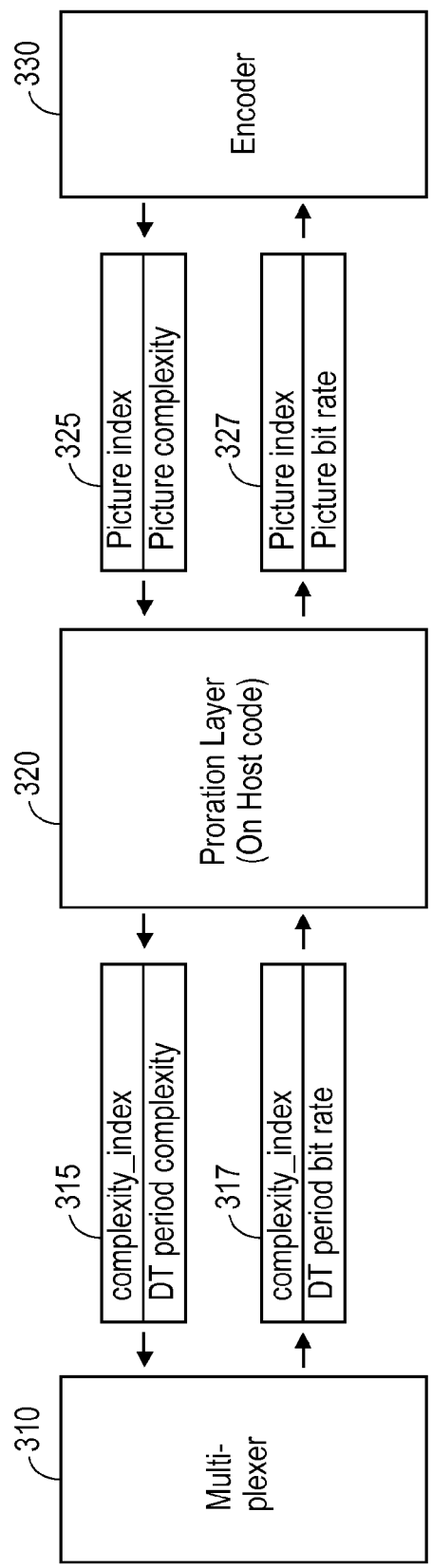
FIG. 3 shows a proration layer structure where the complexity and bit rate are prorated.

The statistical video multiplexer may be running at a different system clock from that of the video encoders. Furthermore, the statistical video multiplexer may adopt a time interval which is different from the inherent video interval of the video encoder such as a frame or field interval. The time interval or time period for the statistical video multiplexing is designated as the DT period throughout this specification. In order to hide the complexity of video frame and field times from the statistical video multiplexing system, the picture complexities are prorated to DT period complexity. When bitrate information is received, the DT period bitrate is prorated back to picture bitrate values. The relationship between the statistical video multiplexer 310, the proration layer 320, and the video encoder 330 is shown in FIG. 3. The encoder 330 sends the picture complexity 325 to the proration layer 320 for proration. The proration layer 320 then prorates the picture complexity 325 into DT period complexity 315 and sends it to the multiplexer 310. The multiplexer 310 communicates the DT period bitrate 317 to the proration layer 320 where the DT period bitrate is converted to picture bitrate 327 for the encoder 330. The proration layer function can be implemented in each individual video encoder. However, it can also be implemented as a separate part associated with each video encoder.

The details of complexity proration are described as follows. The related parameters are defined first:

a. $j^{th}$ DT period starts before the end of $i^{th}$ picture.

b. d=start time of $j^{th}$ DT period minus the start time of $i^{th}$ picture.

c. DT=duration of DT period.

d. PD=Picture Duration.

e. $CP_i$=Complexity for $i^{th}$ picture.

The prorated complexity value for the $j^{th}$ DT period $C_j$ is calculated using the following formula.

$$C_j = \begin{cases} CP_i & d + DT < PD \\ \dfrac{CP_i \cdot (PD - d) + CP_{i+1} \cdot (d + DT - PD)}{DT} & PD < d + DT < 2PD \\ \dfrac{CP_i \cdot (PD - d) + CP_{i+1} \cdot PD + CP_{i+2} \cdot (d + DT - 2PD)}{DT} & d + DT > 2PD \end{cases}$$

Figure 4A:
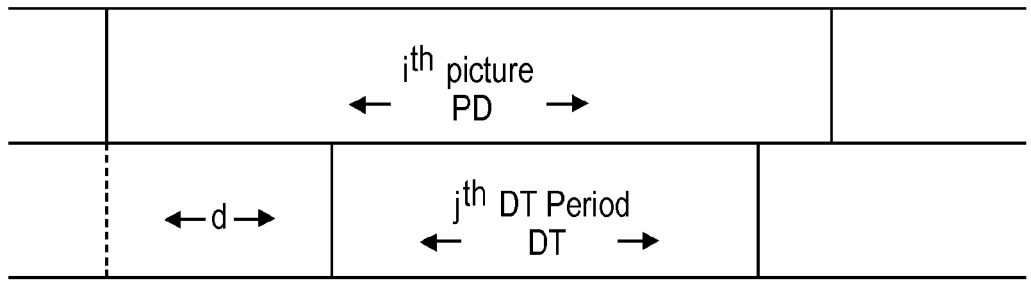
FIG. 4A shows an example of complexity proration for the case p+PD<DT.
Figure 4B:
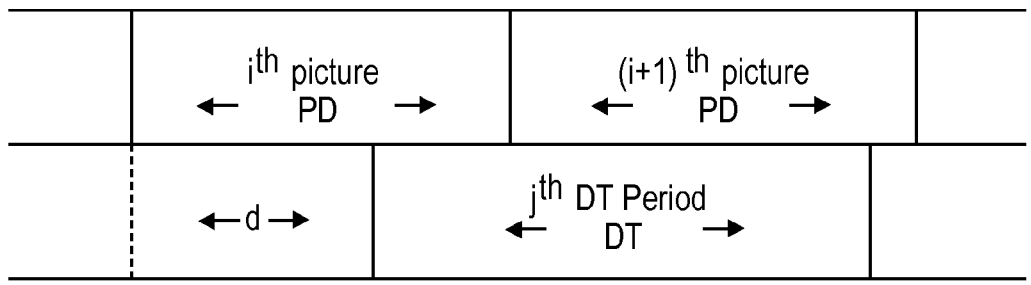
FIG. 4B shows an example of complexity proration for the case DT<p+PD<2DT.
Figure 4C:
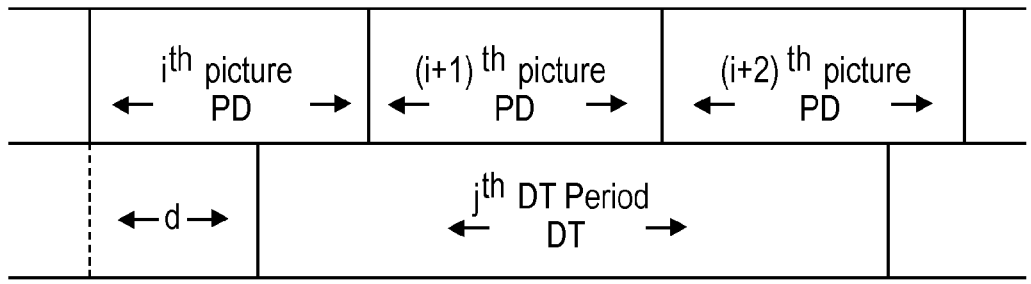
FIG. 4C shows an example of complexity proration for the case p+PD>2DT.

The above equation can be easily understood by referring to the drawings in FIGS. 4A to 4C. FIG. 4A illustrates the case d+DT<PD where the upper row is according to the picture index and the lower row is according to the DT period index. FIG. 4B illustrates the case PD<d+DT<2PD and FIG. 4C illustrates the case d+DT>2PD.

The rate received from the multiplexer needs to be prorated back to picture rates. Similar to the complexity proration, the bitrate proration is described as follows. The related parameters are defines as:

$i^{th}$ picture starts before the end of $j^{th}$ DT period.

p=start time of $i^{th}$ picture minus the start time of $j^{th}$ DT period.

DT=duration of DT period.

PD=Picture Duration.

Rj=Rate for $j^{th}$ DT period.

The prorated bitrate value for the $i^{th}$ picture $RP_i$ is calculated using the following formula.

$$RP_j = \begin{cases} R_j & p + PD < DT \\ \dfrac{(DT - p) \cdot R_j + (p + PD - DT) \cdot R_{j+1}}{PD} & DT < p + PD < 2DT \\ \dfrac{(DT - p) \cdot R_j + DT \cdot R_{j+1} + (p + PD - 2DT) \cdot R_{j+2}}{PD} & p + PD > 2DT \end{cases}$$

Figure 5A:
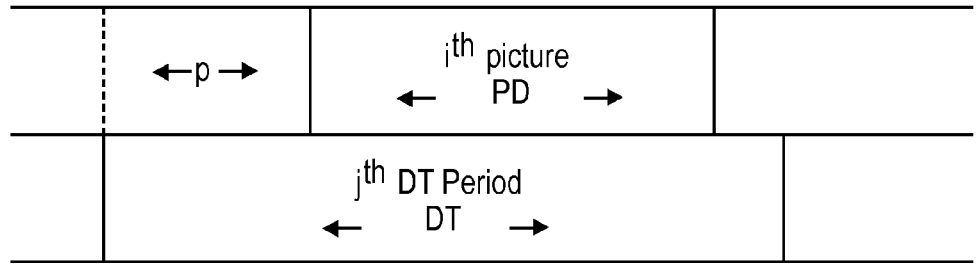
FIG. 5A shows an example of bit rate proration for the case p+PD<DT.
Figure 5B:
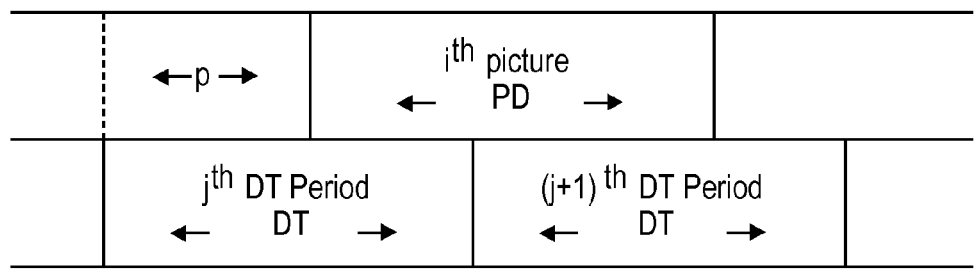
FIG. 5B shows an example of bit rate proration for the case DT<p+PD<2DT.
Figure 5C:
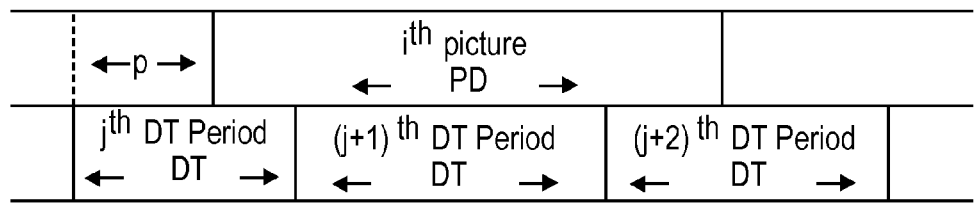
FIG. 5C shows an example of bit rate proration for the case p+PD>2DT.

The above equation can be easily understood with the help of drawings in FIGS. 5A to 5C. FIG. 5A illustrates the case p+PD<DT where the upper row is according to the picture index and the lower row is according to the DT period index. FIG. 5B illustrates the case DT<p+PD<2DT and FIG. 5C illustrates the case p+PD>2DT.

Encoders send complexity messages to the multiplexer using a protocol defined elsewhere in this specification (infra). The picture statistics are prorated to DT period statistics. DT period complexity information is then assigned a complexity index value and sent to the multiplexer in DT period intervals. Based on round-trip delay between the encoder and the multiplexer, up to 4 more look-ahead complexity values can also be sent to the multiplexer in the same complexity message. While the maximum look-ahead information used here is 4 DT periods, it is understood that this is just one exemplary case to illustrate the operation of the statistical multiplexing system and that the present invention is not limited by this particular maximum DT look ahead number.

Figure 6:
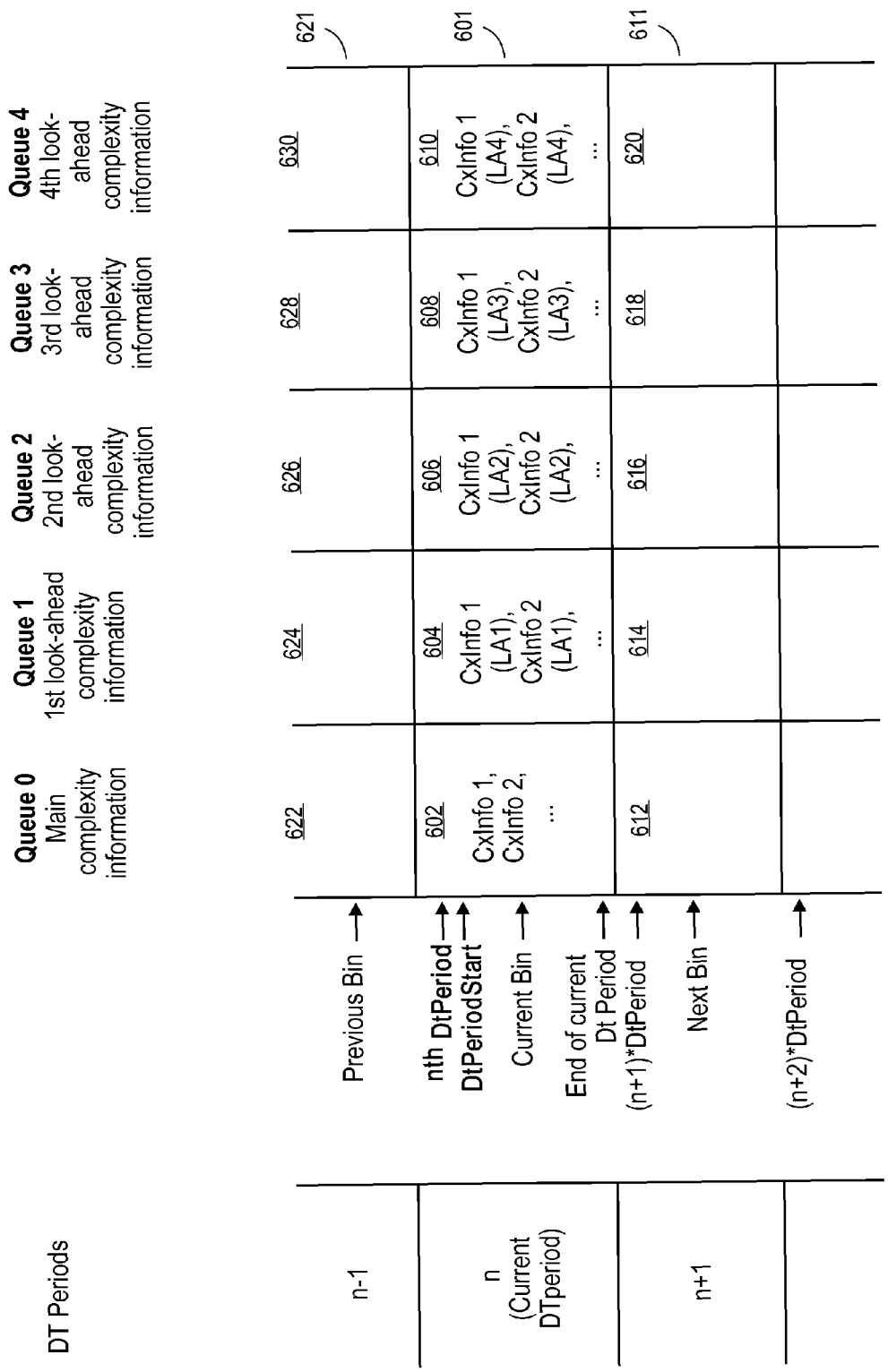
FIG. 6 shows a complexity data structure at the multiplexer.

The multiplexer keeps queues of complexity information bins as shown in FIG. 6 where each row represents the bins corresponding to a DT period. For example, row 601 corresponds to bins at the $n^{th}$ DT period, row 611 corresponds to bins at the $(n+1)^{th}$ DT period, and row 621 corresponds to bins at the $(n-1)^{th}$ DT period. Each bin has space for complexity information from up to 64 encoders. When the complexities from all active encoders have been received for a bin, the rate can be calculated and sent to the encoders.

The complexity index is used to place the complexity information in the correct queue location.

The other queues keep information for future (look-ahead) complexities. For example, for the $n^{th}$ DT period, bin 602 keeps the main complexity information, bin 604 keeps the first look-ahead information, bin 606 keeps the second look-ahead information, bin 608 keeps the third look-ahead information, and bin 610 keeps the fourth look-ahead information. Similarly, bins 612 to 620 keep the respective information for the $(n+1)^{th}$ DT period and bins 622-630 keep the respective information for the $(n-1)^{th}$ DT period.

The multiplexer has a timer that executes a function in DT period intervals. Each DT period has a bin number associated with it. Current bin number refers to the bin number for current DT period and is the one that keeps all the complexity information used to calculate the rate for current DT period.

When the first complexity information from an encoder arrives at the multiplexer, it needs to go to a bin. The initial bin is selected according to the following formula:

$$InitialBin = CurBin + (RxTime - CurDtPeriodStartTime + 2*MaxJitter)/DtPeriod,$$

where CurBin is the bin associated with the DtPeriod in which the complexity message was received, RxTime is the arrival time of complexity message, CurDtPeriodStartTime is the start time of current DtPeriod (The DT period in which the complexity message was received), and MaxJitter is the maximum network communication jitter. The parameter MaxJitter is a value provisioned by a network management system to the statistical multiplexer.

The number of active encoders will be incremented after a bin is successfully assigned to the first complexity information from an encoder. After the InitialBin is calculated and used, an association between complexity_index and bin numbers (or DT periods) is created. This association remains in effect as long as the connection between multiplexer and encoder exists.

A rate message will be created and sent when the last complexity message for that DT period is received. In normal cases this will be before the end of DT period. If the complexity message from one or more encoders is not received until the end of a DT period, a rate message will be created and sent at the end of the DT period. Any complexity message received for that bin after this time is considered late. The main complexity in the message is discarded, but the look-ahead complexities can still be used.

When calculating the rate for the encoders for which no complexity message was received, the multiplexer will use the nearest look-ahead information if it is available. If a look-ahead complexity is not available, the previous complexity information is used. If the complexity information for an encoder is not received for x consecutive DT periods, the number of active encoders is decremented and mux goes to the startup state for the encoder.

The arrival time of each complexity message is stored in the assigned bin with the complexity information. When a rate is calculated, the time_on_mux parameter is calculated by subtracting the arrival time from current time. This parameter indicates the amount of time that a complexity message was waiting in the multiplexer to be used in the rate calculation.

When creating a rate message the multiplexer also calculates the multiplex time for current DT period as follows:

$$mux\_time = DtPeriodStart + MuxRoundTripDelay,$$

where MuxRoundTripDelay is the time from the beginning of current DT period to the time that the first TS packet from each encoder for this DT period is removed from the multiplexer's input buffer and processed for multiplexing. In other words, the first video TS packet created for this DT period will have an HRTP (HRTP is an extension of RTP protocol (RFC-3550) and is used to transfer information between encoders and multiplexers) time stamp equal to mux_time.

The parameter MuxRoundTripDelay is a provisioned value calculated based on maximum value of all delays such as network delay, Forward Error Correction (FEC) for example, and maximum omega, where omega is defined as the time period measured from the moment that the proration layer gets the rate from the rate queue, prorates it to picture bitrate and sends the bitrate to the coding, to the moment that the IP network receives the first TS packet from the pacing. Pacing is the process of delaying the packets in the output queue of the encoder and sent them exactly at the time specified for each packet (Packet Timestamp). This process makes sure that the packets are sent evenly over time based on the bitrate.

When a rate message is received at encoder, it will enter a Rate Queue. The size of the Rate Queue depends on the maximum network delay/jitter allowed for the system and other features such as the ability to reorder out-of-order rate messages.

The received bitrate information is given to the proration layer. The rate information includes the complexity index that indicates which DT period this rate belongs to. The proration layer converts the DT period bitrate and complexity index to picture bitrate and picture index. The picture bitrate is then passed to the coding chip just before it is going to encode the picture with the specified picture index.

The bitrate information for the DT period is also given to the packetizer so that it will create the TS packet using the specified bitrate during the specified DT period. The HRTP timestamps of the TS packets are calculated based on the mux_time value received in the rate message and an increment value that is calculated based on current bitrate. The first packet will have an HRTP time stamp equal to mux_time. The next packets will have a time stamp equal to mux_time+ increment, mux_time+2*increment, . . . .

The timestamp calculation around DT period boundaries is slightly different. It needs to account for the partial packets that pass a DT period boundary. To simplify the above explanation, we assumed that the first packet begins exactly at the start of DT period.

Figure 7:
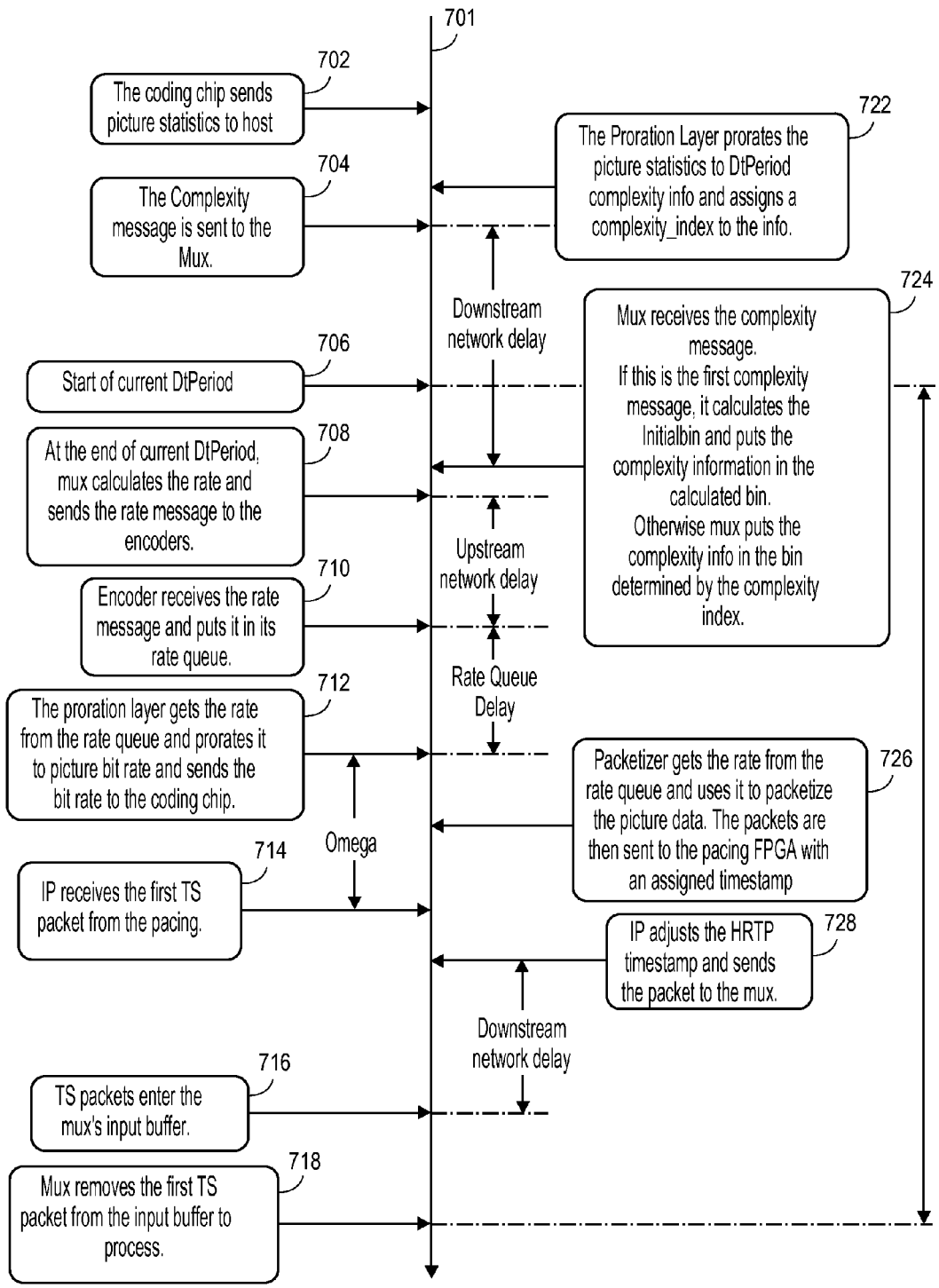
FIG. 7 shows a timeline for the events associated with the multiplexer.

An exemplary timeline for the statistical multiplexer is shown in FIG. 7 where the arrowed line 701 represents the timeline. The first action 702 is the time when the coding chip inside the encoder sends picture statistics to a host processor in the encoder. In action 722, the Proration Layer prorates the picture statistics to DtPeriod complexity info and assigns a complexity_index to the info. The Complexity message is then sent to the statistical multiplexer in block 704 and received by the multiplexer at time corresponding to block 724. At a certain time 706 that may not be synchronized with the encoder time, the multiplexer may start its current DT period and at the end of the current DT period 708, the multiplexer calculates the rate and sends the rate message to the encoders that is then received by the encoder at block 710 subject to some upstream network delay. The rate information received by the encoder is stored in the rate queue and the proration layer gets the rate from the rate queue at block 712 subject to some rate queue delay. The proration layer then prorates the received rate information to picture bitrate and sends the bitrate to the coding chip inside the encoder. In block 726, packetizer gets the rate from the rate queue and uses it to packetize the picture data. The packets are then sent to the pacing FPGA Pacing FPGA is the hardware component used to do the pacing process as defined above.

The present invention is mainly focused on the statistical multiplexing methods and systems with improved performance. The actual video data being transmitted from video encoders to the multiplexer is not shown in the drawings in FIGS. 1 and 2. For those skilled in the art, it is well known to produce video data to match the allocated bit rate. The IP (IP is a software subsystem inside encoder that is responsible for all Ethernet network communications.) receives the first TS (Transport Stream) packet from the pacing in block 714, and adjusts HRTP timestamp and sends the packet to the multiplexer in block 728. After downlink delay, the TS packets enter the multiplexer input buffer in block 716 and the multiplexer removes the first TS packet from the input buffer to process in block 718. The timeline in FIG. 7 has shown the instances starting with the encoder sending statistics, i.e., picture complexity, and ending with the multiplexer processing the compressed video data, i.e., TS packets. During this period, a full cycle of processing is completed, including the encoders generating the complexity values and sending them to the multiplexer, the multiplexer generating bit rates and communicating them to the encoders, encoders generating video packets according to the bit rate allocated and sending the packets to the multiplexer, and the multiplexer receiving and processing the packets.

Handling Network Delay Changes

As noted above, the delay over IP networks has dynamic characteristics. When network traffic is high, longer delays are likely. Conversely, when network traffic is low, delays are likely to be minimal. These periodic delay changes, may be rather frequent. In order to ensure proper system operation, a mechanism to handle the delay changes is needed. The method and system to handle the delay changes are described by way of exemplary cases where three encoders are used. Those skilled in the art should be able to appreciate the present invention and extend to cases with different numbers of encoders and different network environments.

Assume that the amount of network delay change in worst case is n DT periods one way. For example, if in the worst case, network delay changes from 10 ms to 120 ms one way, n would be 4.

The round-trip delay used for all LAN encoders is:

$$RTD = RTDbest + n,$$

where the RTDbest is the lowest possible round trip value based on encoders in LAN (Local Area Network) mode with minimum queuing on both Encoder and the multiplexer. In current system RTDbest=9 field times for NTSC. For encoders on the longest possible network delay the round-trip delay is:

$$RTD = RTDbest + 2n.$$

Encoders send the complexities as soon as they are available. The multiplexer receives complexities, calculates, and sends the rates as soon as the complexities for all encoders are available for each DT period. For the encoders in LAN mode there will be n rates available in the rate queue. For the encoders with the longest network delay the rate queue will be almost empty and the rates will arrive just in time to be used.

When an encoder experiences a network delay change of m DT periods, the fullness of the rate queue for that encoder changes by m. In the worst case, the fullness goes from n to 0.

Notations:
C(e,c): The complexity value for encoder e, for DT period specified by complexity index c.

C'(e,c): The look-ahead complexity value for encoder e, for DT period specified by complexity index c.

R(e,c): The rate calculated by the video multiplexer for encoder e, to be used for DT period specified by complexity index c.

R'(e,c): The rate calculated by the video multiplexer for encoder e, to be used for DT period specified by complexity index c. This is sent by video multiplexer when it does not receive the main complexity in time for the DT period specified by c. So it uses the Look-Ahead complexity C'(e,c) for rate calculation.

In the following example, some assumptions are made about the system:

a. The biggest change in the network delay is 4 DT periods. (n=4, $RTD_{best}=1$), and b. There are encoders 1, 2, and 3. Encoders 1 and 2 are running in LAN mode (0 network delay). Encoder 3 is running in the longest network delay (4 DT Periods).

It is understood that the above assumptions are used as an example to describe the system operations. By no means are they intended as limitations of the present invention. Those skilled in the art can easily extend the cases with a different number of encoders and different network environment having different network delays among different encoders.

Exemplary Case 1: Handling Network Delay Increase

In this example we assume that there is a network delay change for Encoder 1. The network delay will increase from 0 to 4 DT periods.

Figure 8:
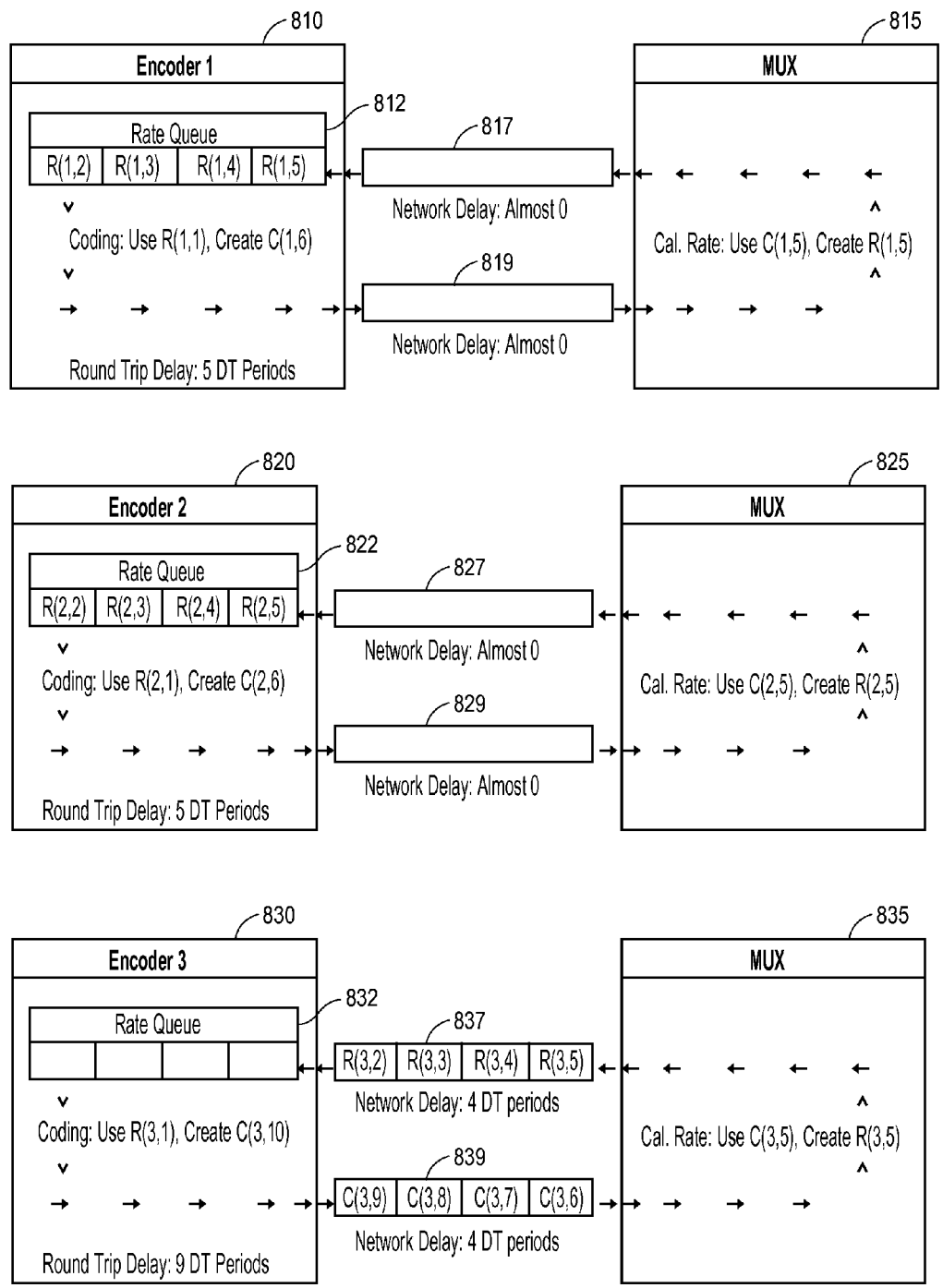
FIG. 8 shows the states of a sample video multiplexing system having three video encoders before the network delay for video encoder #1 increases from 0 to 4 DT periods.

The states of the three encoders before the change in network delay are shown in FIG. 8. The multiplexer part 815 is a part of the multiplexer responsible for handling video encoder #1 810. At the current instance, the multiplexer part 815 uses complexity C(1,5) just received from the video encoder #1 810 to generate bit rate R(1,5). The bit rate R(1,5) is then sent to the video encoder #1 810 through the uplink network 817. Since there is no network delay, the bit rate R(1,5) is received and placed into the bit rate queue 812 almost instantly. Video encoder #1 810 now stores bit rates R(1,2), R(1,3), R(1,4) and R(1,5) in the rate queue 812. The video encoder #1 calculates complexity C(1,6) based on R(1,1) and sends it through network 819 having 0 delay. Video encoder #2 820 operates similarly to video encoder #1 810. Video encoder #2 includes a rate queue 822, receives bit rates through uplink network 827, and sends complexity values through downlink network 829. The multiplexer part 825 handles video encoder #2 820.

The uplink network 837 and downlink network 839 for video encoder #3 830 to communicate with the multiplexer part 835 are subject to 4 DT periods of network delay as shown in FIG. 8. At the current time, 4 bit rates (R(3,2), R(3,3), R(3,4) and R(3,5)) and 4 complexity values (C(3,6), C(3,7), C(3,8) and C(3,9)) are still in transit in the networks. The rate buffer 832 is empty.

Figure 9:
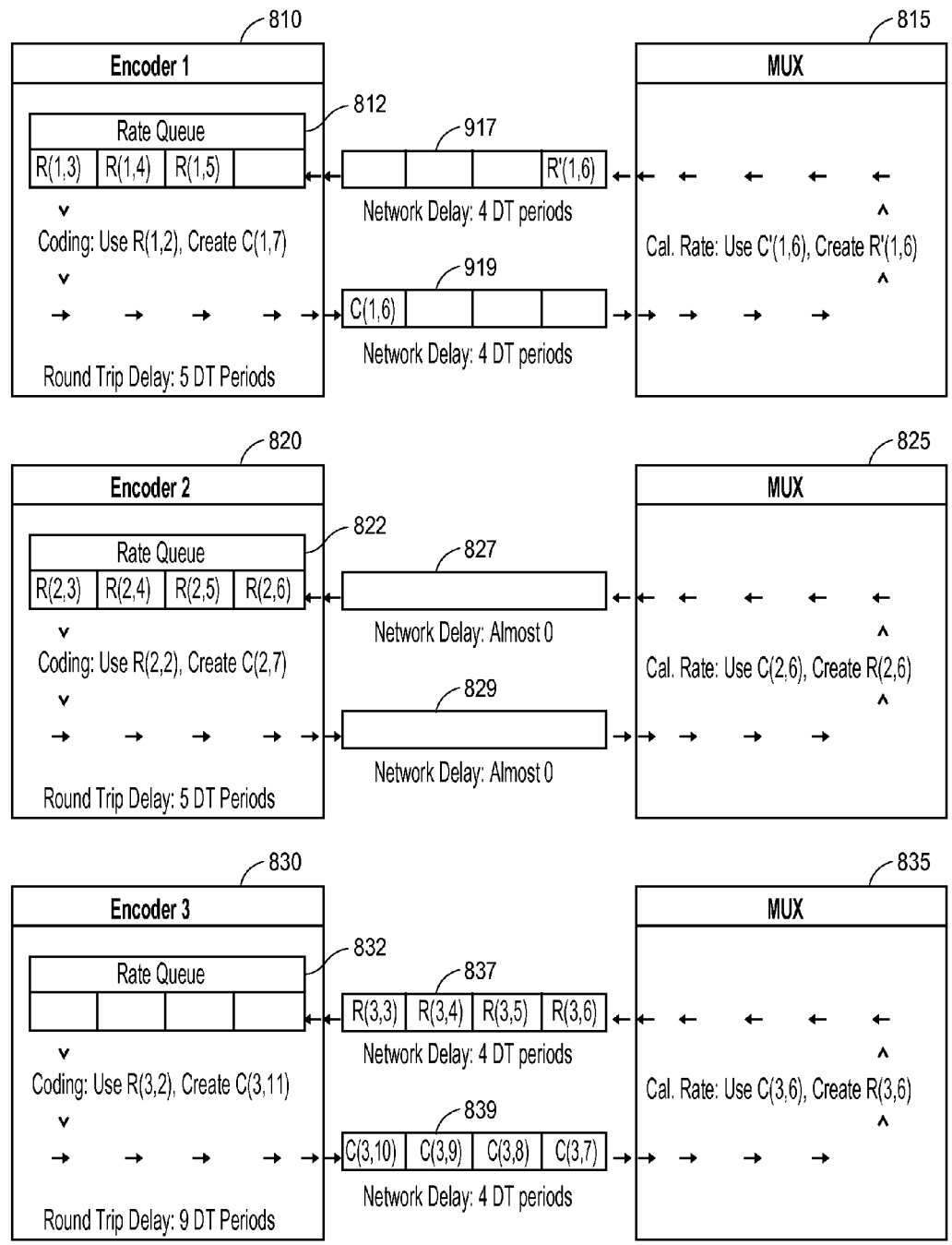
FIG. 9 shows the states of a sample video multiplexing system having three video encoders during a network delay increase.

Now the network delay for Encoder 1 changes from 0 to 4 DT periods. The states of encoders after this change are shown in FIG. 9 at 1 DT period after the states of FIG. 8. Unlike the instance of FIG. 8, the networks for the video encoder #1 810 are now subject to network delay. As shown in FIG. 9, the multiplexer part 815 could not receive the main complexity value C(1,6) on time and has to use the look-ahead complexity value C'(1,6) previously received to calculate the bit rate. Since the bit rate is based on a look-ahead complexity value instead of the main complexity value, the bit rate is designated as R'(1,6). Due to network delay, bit rate R'(1,6) is in the queue of unlink network 917. For video encoder #2 820 and video encoder #3 830, they both function as before.

Figure 10A:
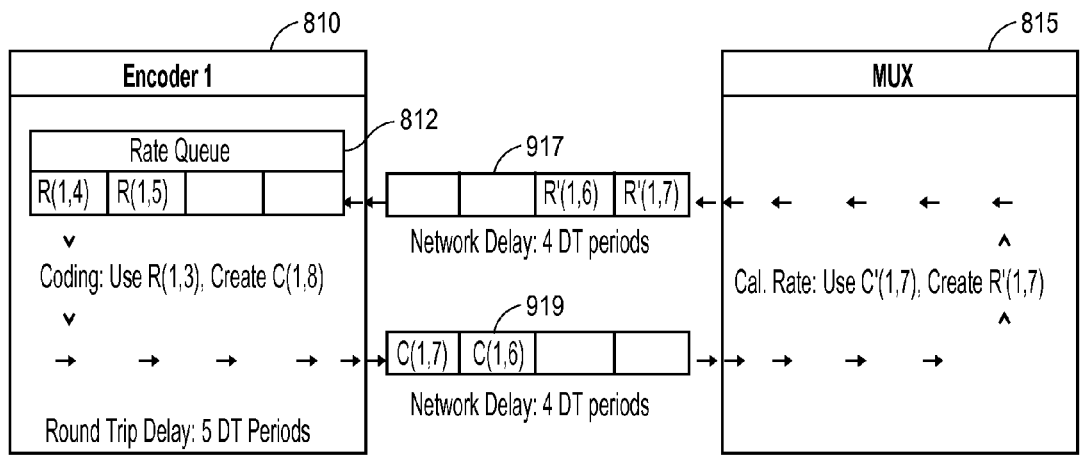
FIG. 10A shows the state of the sample video encoder #1 at 1 DT period after the state of the sample video encoder #1 of FIG. 9.
Figure 10B:
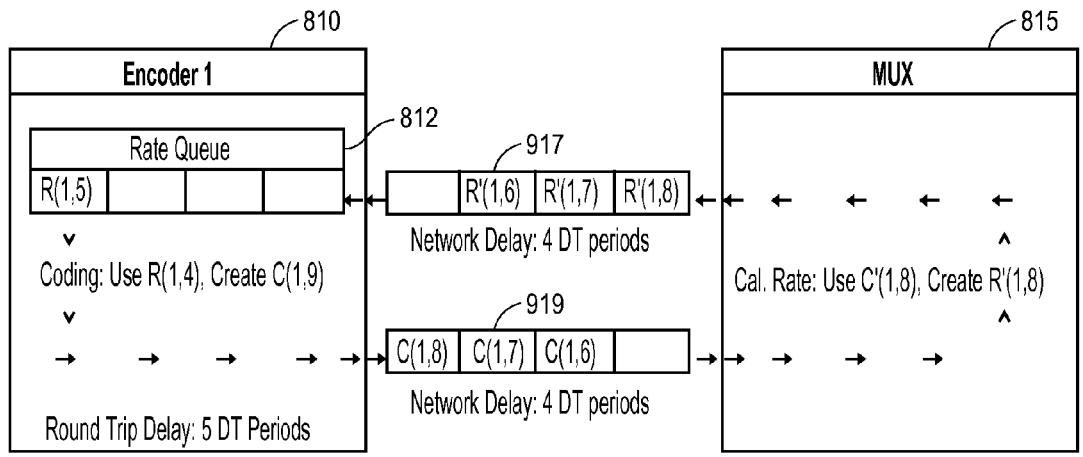
FIG. 10B shows the state of the sample video encoder #1 at 1 DT period after the state of the sample video encoder #1 of FIG. 10A.
Figure 10C:
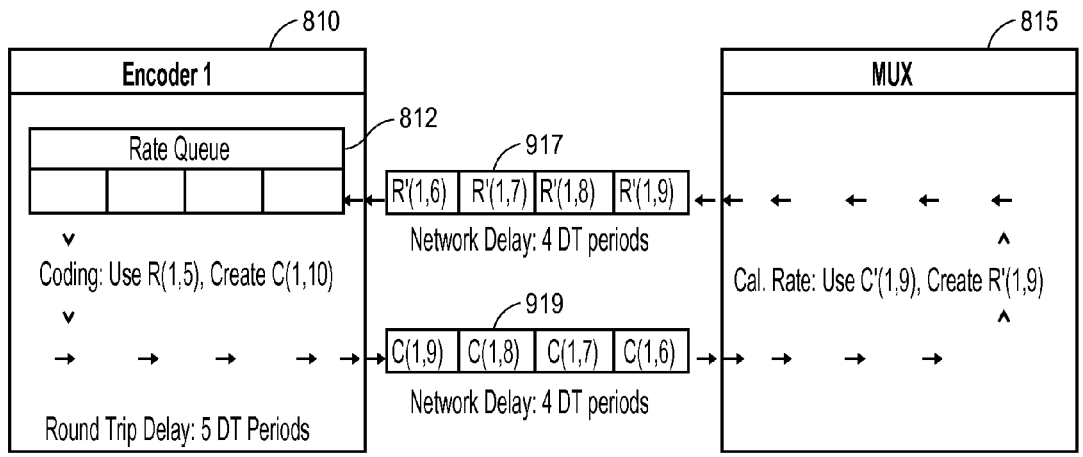
FIG. 10C shows the state of the sample video encoder #1 at 1 DT period after the state of the sample video encoder #1 of FIG. 10B.
Figure 10D:
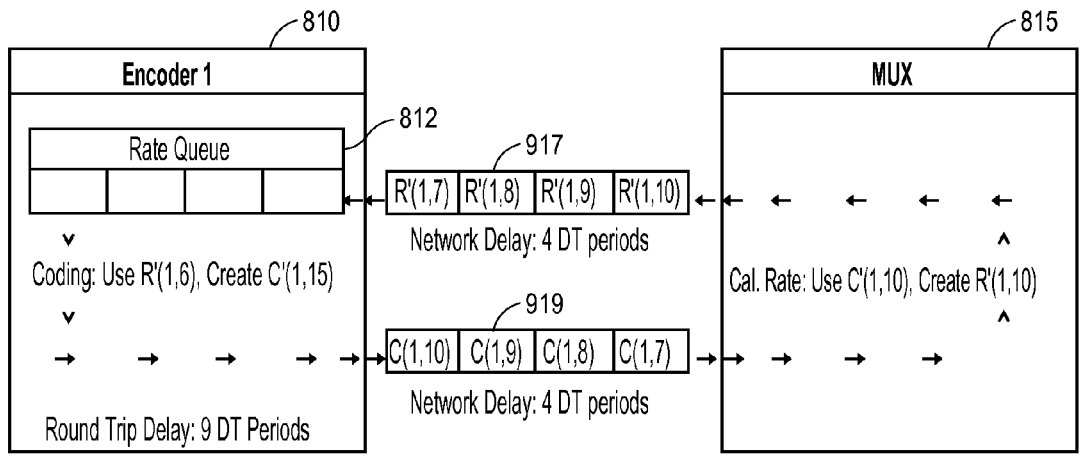
FIG. 10D shows the state of the sample video encoder #1 at 1 DT period after the state of the sample video encoder #1 of FIG. 10C.

The network change for video encoder #1 810 will cause its operations to remain in a transitional stage for a few DT periods. The states associated with video encoder #1 810 during the next 4 DT periods are shown in FIGS. 10A-D. From FIG. 10A to FIG. 10C, the queues for bit rates and complexity values grow from 2 values to full queue. FIG. 10D shows the video encoder #1 810 starts to receive delayed bit rate R'(1,6) and to create complexity value based on the R'(1,6).

Figure 11:
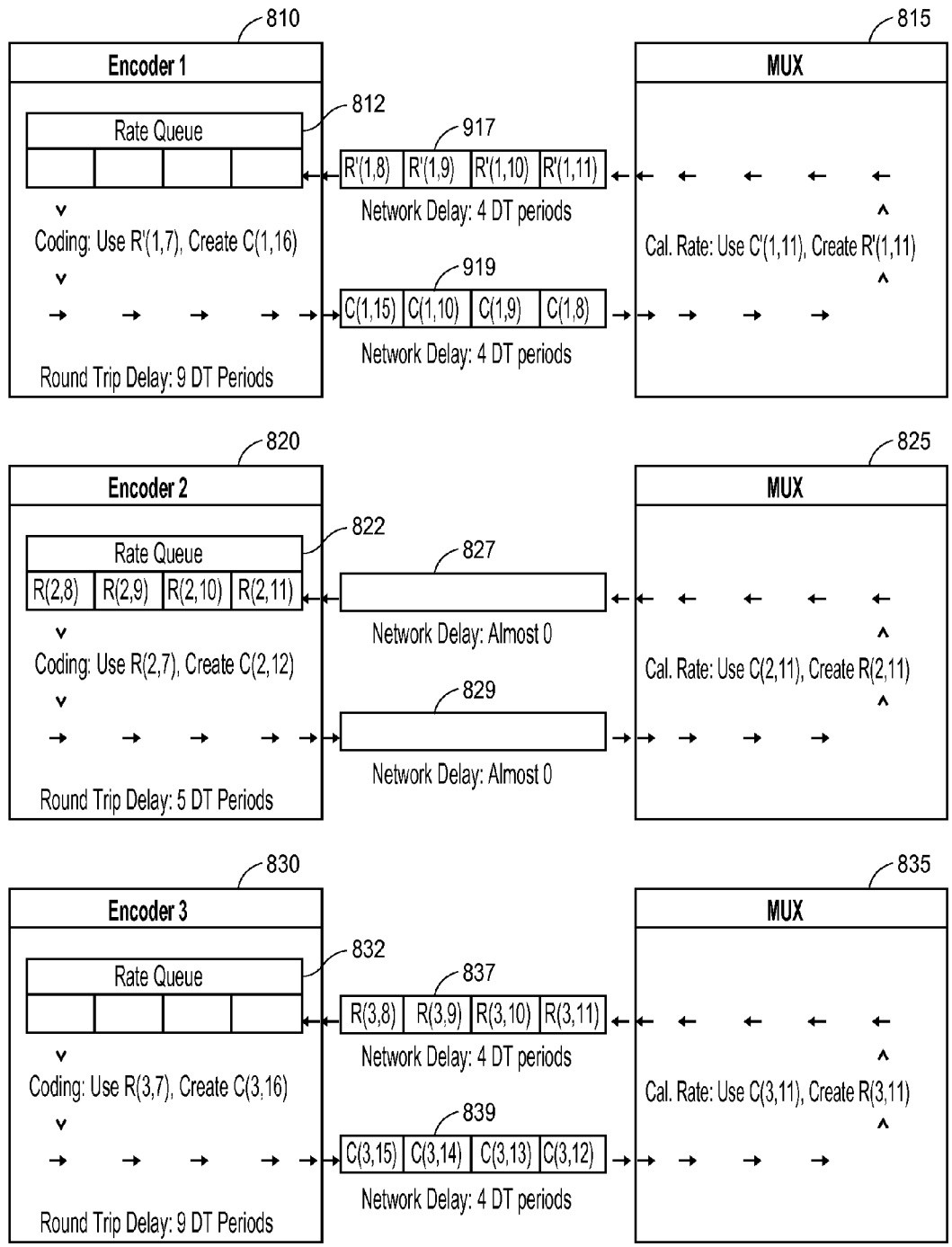
FIG. 11 shows the states of a sample video multiplexing system having three video encoders during network delay change where the bit rates and complexity values are at the maximum network delay.
Figure 12A:
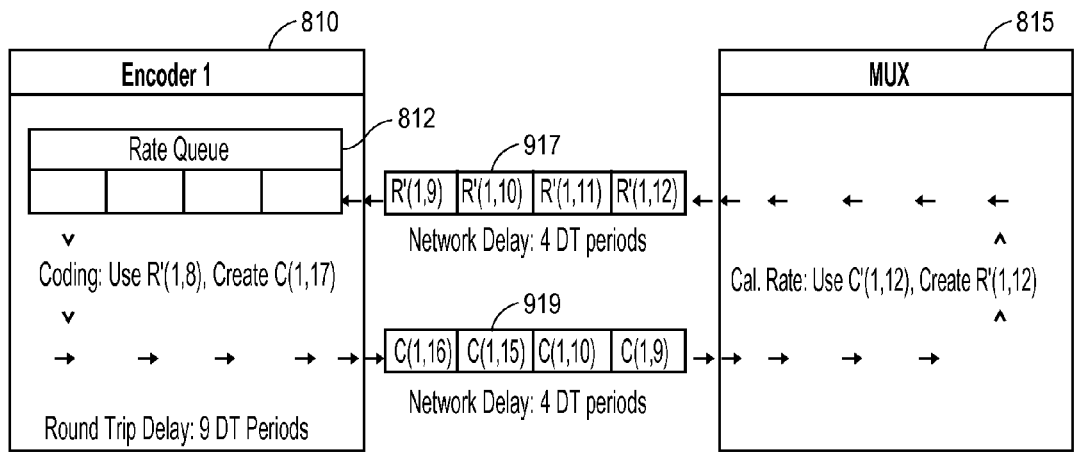
FIG. 12A shows the state of the sample video encoder #1 at 1 DT period after the state of the sample video encoder #1 of FIG. 11 during the transition of the network delay from 0 to 4 DT periods.
Figure 12B:
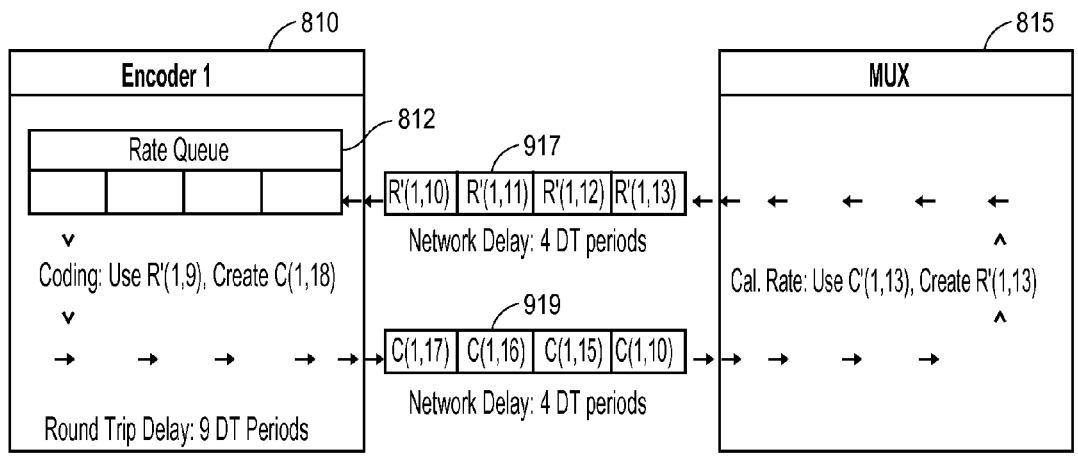
FIG. 12B shows the state of the sample video encoder #1 at 1 DT period after the state of the sample video encoder #1 of FIG. 12A during the transition of the network delay from 0 to 4 DT periods.
Figure 12C:
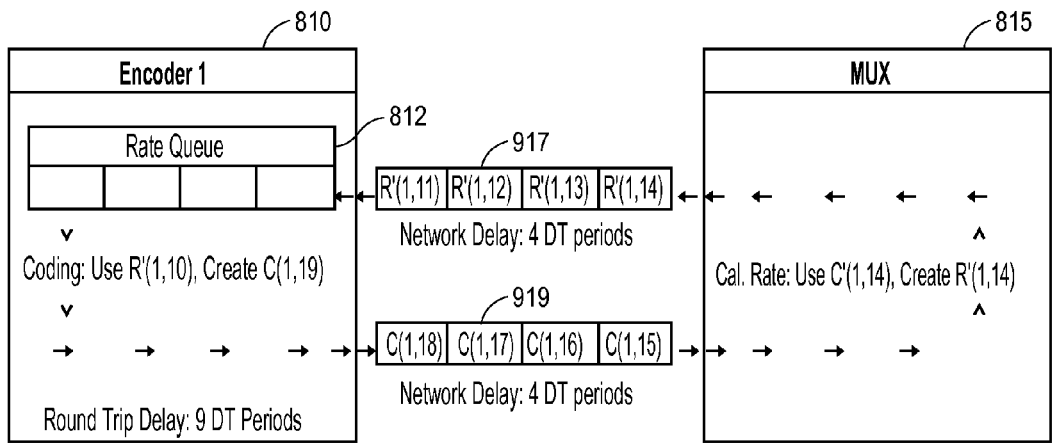
FIG. 12C shows the state of the sample video encoder #1 at 1 DT period after the state of the sample video encoder #1 of FIG. 12B during the transition of the network delay from 0 to 4 DT periods.
Figure 12D:
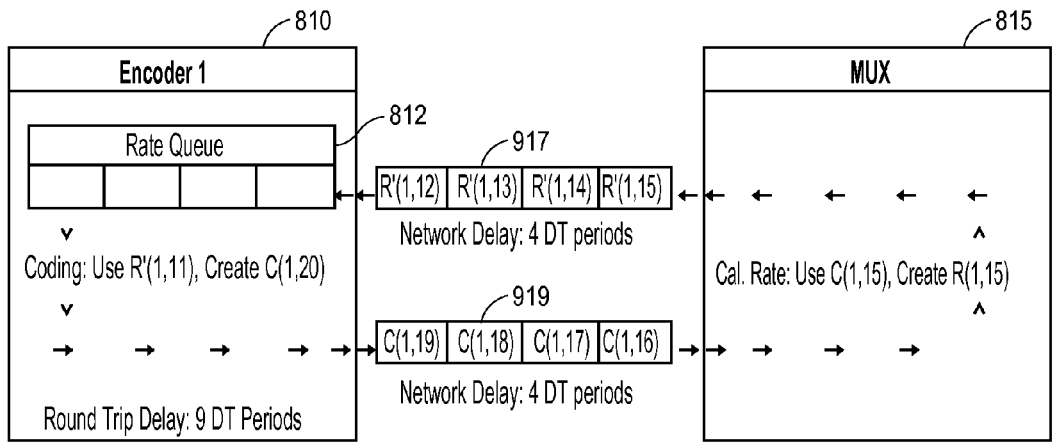
FIG. 12D shows the state of the sample video encoder #1 at 1 DT period after the state of the sample video encoder #1 in FIG. 12C during the transition of the network delay from 0 to 4 DT periods.

At the same time, the video encoder #1 810 notices that the bit rate buffer becomes empty from full and needs to create complexity value having an index further into the future to accommodate the new network delay. So it detects the network delay change and instead of creating the next complexity C(1,11), it creates the complexity in future C(1,15). The RTD for this encoder changes from 5 to 9 DT periods. The states of encoders after this are shown in FIG. 11. While the video encoder #1 810 sends the complexity value C(1,15) having a new complexity index 15, C(1,15) is queued due to network delay and the multiplexer will not receive it until another 3 DT periods later. Before the timely complexity value is received, the multiplexer will have to continue using the look-ahead complexity values as shown in FIGS. 12A-12D. FIGS. 12A-12D show 4 consecutive states associated with the video encoder #1 810. In FIG. 12A, the complexity value C(1,15) moved further down toward the multiplexer from the states corresponding to FIG. 11. In the bottom drawing of FIG. 12D, the complexity value C(1,15) finally goes through the network delay and is used by the multiplexer to generate bit rate R(1,15). Up to this moment, the multiplexer has been generating bit rates based on look-ahead complexity values.

It will take 4 more DT periods until Encoder #1 receives the rate R(1,15) which is calculated based on a main complexity value. After that, the system state becomes stable and everything works normally. From this point until another new network delay, there is no change in the behavior of Mux or other encoders.

Exemplary Case 2: Handling Network Delay Decrease

When the network delay decreases, some processing will be required for both the encoder side and the multiplexer side to ensure correct operations. Again, an exemplary case is used to illustrate the steps for embodying the present invention. It is understood that the exemplary case is used mainly to illustrate the steps involved in the current invention. By no means is the exemplary case intended as a limitation to the present invention.

Figure 13:
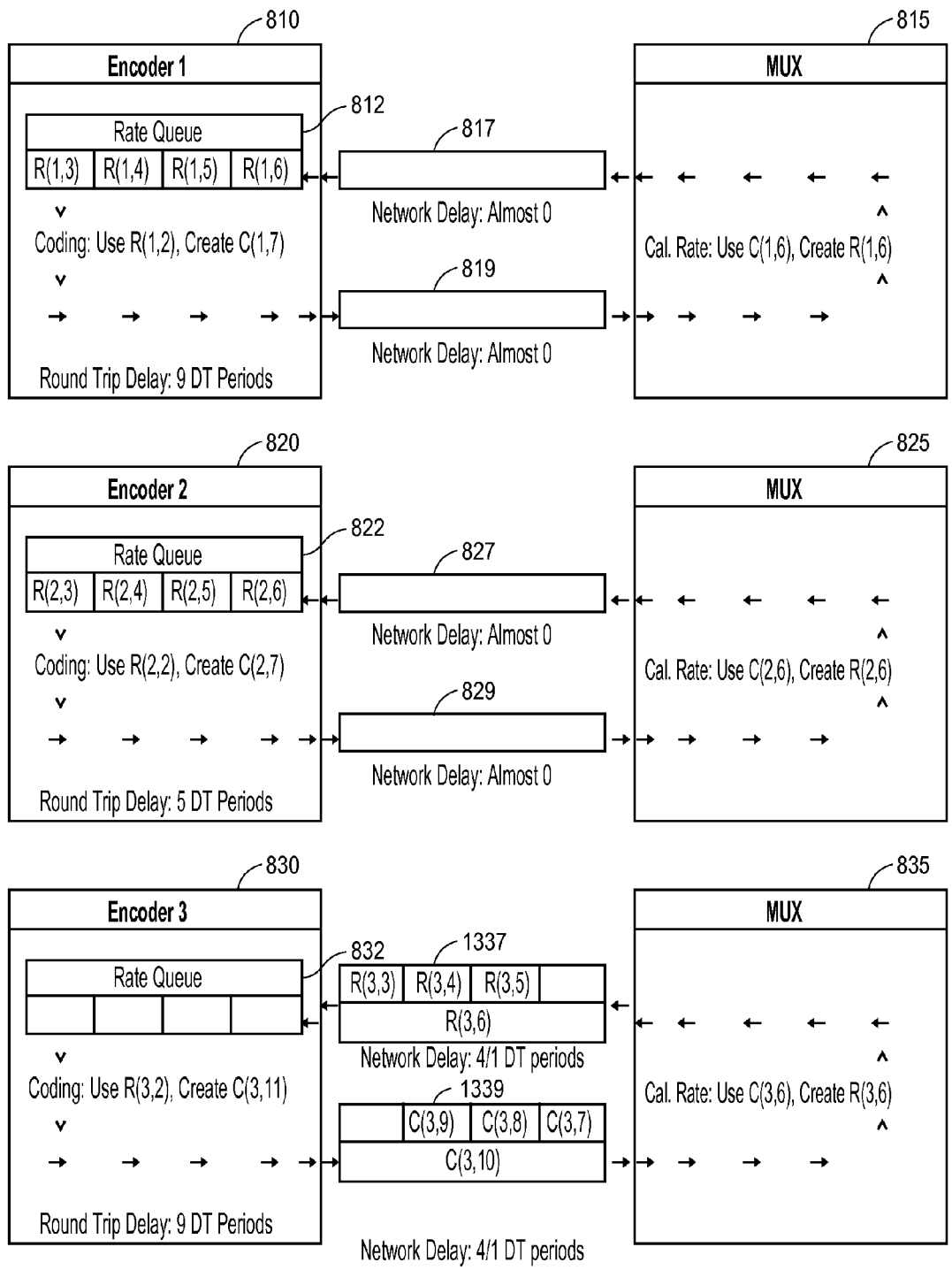
FIG. 13 shows the states of a sample video multiplexing system having three video encoders before the network delay for video encoder #3 decreases from 4 to 1 DT period.

The states associated with the three encoders before the network delay change is shown in FIG. 8. Starting with initial state, now assume that there is a network delay change for Encoder 3. Now the network delay for Encoder 3 changes from 4 to 1 DT period. Depending on how the network devices handle this situation, this change may cause reordering of rate and complexity messages. The states of encoders after this change are shown in FIG. 13 for the instance at 1 DT period after the network delay change. As shown in FIG. 13, the previous bit rates R(3,3), R(3,4) and R(3,5) are still queued in the network while the just-sent bit rate R(3,6) is also in the uplink network queue 1337 during the transition. Similarly, the previously sent complexity values C(3,7), C(3, 8), and C(3,9) and the just-sent complexity value C(3,10) are all in the downlink network queue 1339.

Figure 14A:
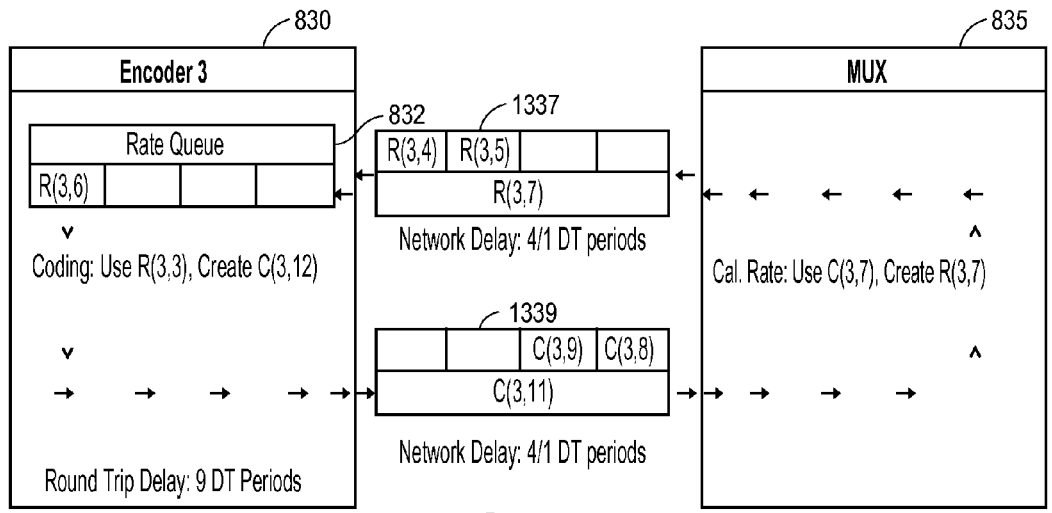
FIG. 14 shows the states of a sample video multiplexing system having three video encoders at 1 DT period after the network delay for video encoder #3 decreases from 4 to 1 DT period.
Figure 14B:
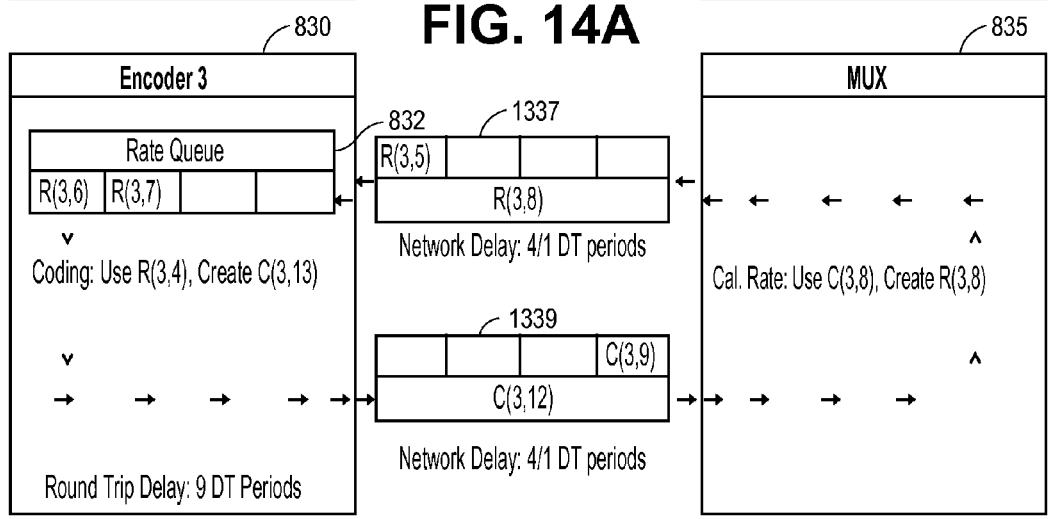
Figure 14C:
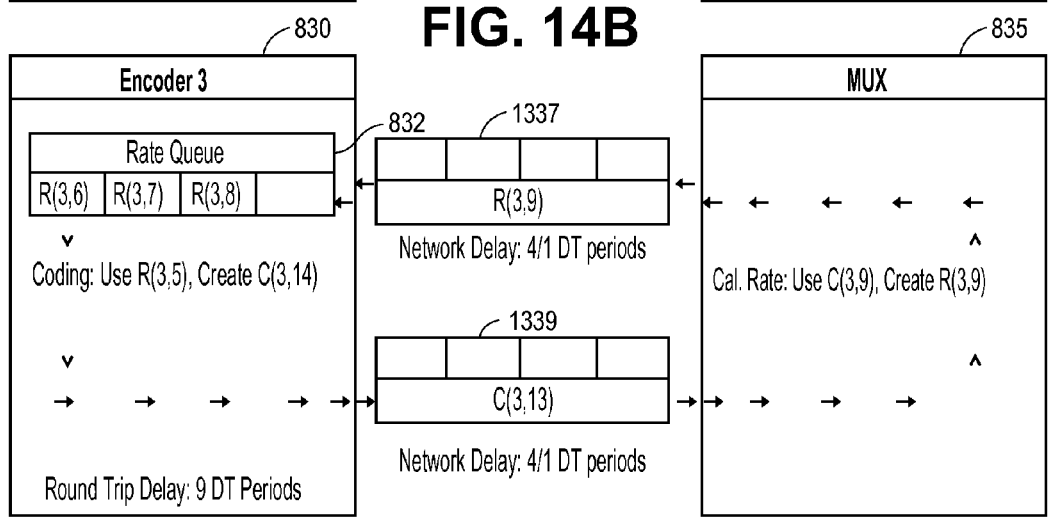

In the next DT period, encoder 3 receives rates R(3,3) and R(3,6). The rate R(3,3) is just in time to be used by the encoder for coding the underlying video source. R(3,6) is too early to use it and it stays in the rate queue 832 as shown in FIG. 14A. Also mux will receive the complexity messages C(3,7) and C(3,10). C(3,7) will be used for rate calculation. C(3,10) is too early and it will go to its related bin and wait until the rate calculation time for that period. The state of Encoder #3 for the next 2 DT periods are shown in FIG. 14B and FIG. 14C respectively.

Figure 15:
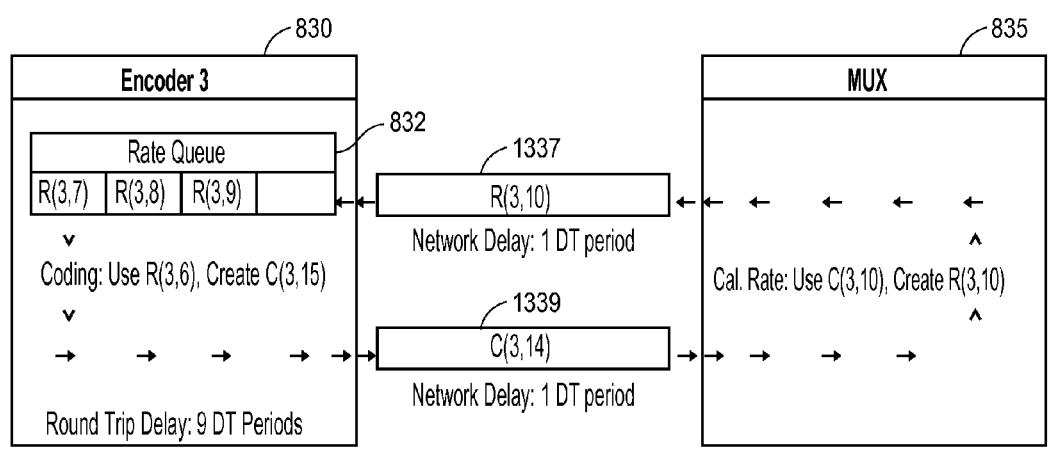
FIG. 15 shows the states of the sample video encoder #3 during the transition of the network delay for video encoder #3 decreases from 4 to 1 DT periods.

Now the change in the network delay is complete. The vide encoder ncoder stays in this mode for some time to make sure the network delay is stable. In the interim, it notices an increase in the value of time_on_mux received in the rate messages R(3,10), and later as shown in FIG. 15.

Figure 16A:
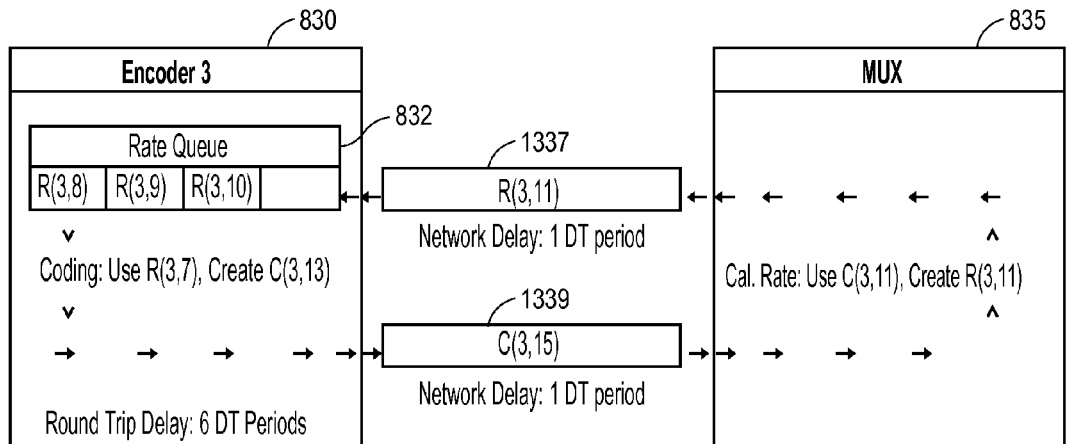
FIG. 16A shows the states of the sample video encoder #3 after the network delay change is stable.
Figure 16B:
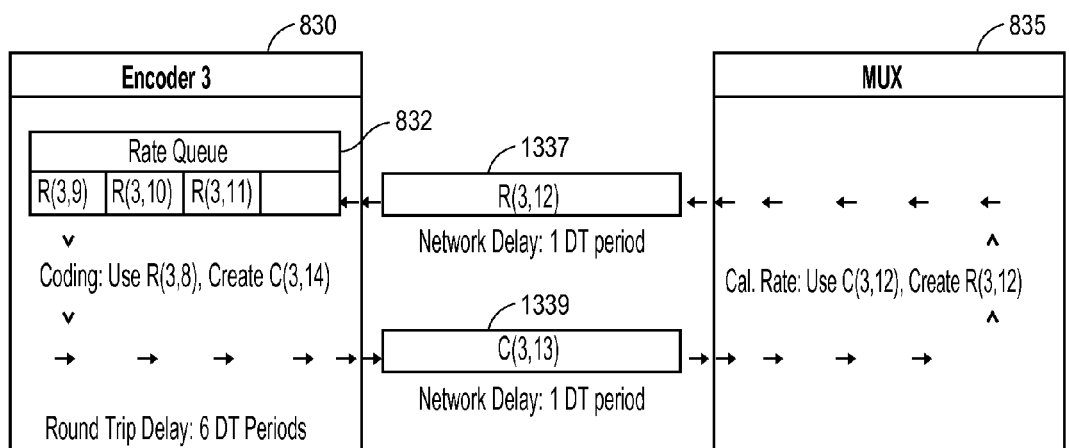
FIG. 16B shows the states of the sample video encoder #3 at 1 DT period after the state corresponding to FIG. 16A.
Figure 16C:
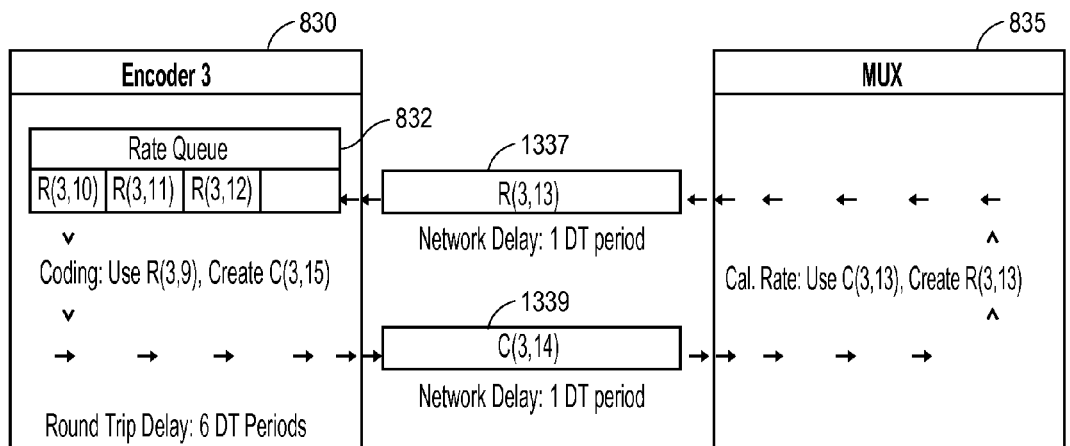
FIG. 16C shows the states of the sample video encoder #3 at 1 DT period after the state corresponding to FIG. 16B.

Then, at the next DT period, the encoder sends the complexities later to ensure better video quality. So instead of creating next complexity C(3,16) it will create a better instance of C(3,13) as shown in FIG. 16A. This results in a change in the round-trip delay for this encoder from 9 to 6. As noted, at this time the video multiplexer already has the look-ahead version of complexity for C(3,13). When the multiplexer receives a complexity for a bin, it will overwrite the existing values with new values. The states associated with video Encoder #3 830 for the next two DT periods are shown in FIGS. 16B and 16C respectively. Now, everything continues as normal. The value of time_on_mux goes back to normal after the rate R(3,13).

Handling Complexity Message Problems at the Multiplexer

If the multiplexer does not receive the complexity message from an encoder by the end of current DT period, it will use the nearest look-ahead complexity information for rate calculations. In the rate message the value of time_on_mux is set to 0xFFFE and the bit downstream_cable_problem is set in rate_flags to indicate that the multiplexer did not receive a complexity for this DT period and the calculated rate is an estimation based on look-ahead complexity. An event will also be added to the multiplexer's event log.

If look-ahead complexity information is not available for the encoder, the multiplexer will use previous complexity to calculate the rate and sets the time_on_mux to 0xFFFD.

If after x DT periods the multiplexer still is not receiving complexity information from the encoder, it will go to startup state for that encoder. This means a nominal bitrate is allocated for that encoder in rate calculation until a communication is established again. The value of x must be more than the maximum number of DT periods it takes for the encoder to detect a network delay change and start sending complexities earlier. For a maximum round-trip delay of 300 msec., we can use x=20.

If the complexity messages are received after the end current DT period, the main complexity in the message cannot be used but the look-ahead complexities can still be used. If the complexity messages continue to arrive late the multiplexer keeps using look-ahead (or previous) complexities, until the number of late/lost complexities exceeds x. Please note that it is the responsibility of the encoder to send the complexities earlier so that the multiplexer does not try to fix the problem of late complexity messages.

If a complexity message is received too early, the video multiplexer will put the information in the next bins. This can happen when there is a network delay change. If the network delay is decreasing, the video multiplexer will probably receive a better complexity for the same bin in future.

Handling Rate Message Problems at Encoder

Encoders have a rate queue that stores received rate messages before they are used by the coding chip and the packetizer. If a single rate message is lost and the depth of queue is more than one, the next rate message will fix the problem because it will include the previous rate information. So we can update the rate queue before the rate is needed by the coding.

If the encoder does not receive the rate message in time for the coding, it will use the look-ahead sum of complexities that was received in the earlier rate messages to calculate a bitrate. If the look-ahead sum of complexities is not available, the encoder uses the previous sum of complexities to calculate an estimated bitrate. In each bitrate message, the encoder always receives the global information (including sum of bitrates, sum of complexities . . . ) for previous and current DT Periods. In normal cases it also receives look ahead global information (Future DT Periods).

Previous sum of complexities in this sentence refers to the value of sum of complexities received in the previous rate message. This bitrate will be given to the coding chip.

If the bitrate is received after the estimated bitrate was send to the coding, but before the packetizer needs the bitrate, the real bitrate received from mux will be used by the packetizer. The VBV correction will then make up for the difference between the bitrates used by the coding chip and the packetizer.

When a rate message is lost, the bit upstream_cable_problem in the complexity_flags parameter is set in the next complexity message sent to the multiplexer. If the rate message is not received in time for a second consecutive time, the encoder will use the nominal bitrate for both coding and packetizer and will generate an alarm indicating the upstream connection was lost. The encoder keeps using the nominal rate in CBR mode until it starts receiving rate message again.

If a rate message is received too early, it just stays in the rate queue. The rate queue is an ordered queue; if the rate messages are received out of order, they will be reordered as they enter the queue.

Handling Large Network Jitters

As explained earlier, the InitialBin assigned to the first complexity message received from an encoder depends on the maximum network jitter.

InitialBin=CurBin+(RxTime−CurDtPeriodStartTime+2*MaxJitter)/DtPeriod

As network jitter increases, the InitialBin will be farther in future compared to CurBin. This works as a complexity queue for the multiplexer and compensates for the big changes in the arrival time of complexities. For example, if maximum one way network jitter is equal to one DtPeriod, the maximum difference between the arrival time of 2 complexity messages is 2 DtPeriods. In this case the InitialBin assigned for the first complexity info will be (CurBin+2).

Time Synchronization

The encoders and multiplexers share a common 27 MHz clock for synchronization of all participating devices in the statistical video multiplexing system. There are two ways time is distributed to the encoders from the multiplexer, the rate message and the STC (System Time Clock) pool message. The actual mechanism is based on the arrival time of the message over IP, measured with the encoder's local 27 MHz mux clock (not locked to the video source) and a PLL filter algorithm that measures differences in these two clocks over time.

One subtle point above is that the clock locking mechanism relies on the timestamp of the STC pool or rate message to be sent with low latency and high accuracy from the multiplexer HW. The video encoders may use the timestamp of the rate messages to recover the clock, which puts a requirement on the system that rate messages for video encoders must be sent with accurate timestamps (not early). Another requirement for the video encoders is that the rate message size is limited to 188 bytes including the MPEG2 transport header. Some video encoders can receive both messages, so their dependency is only on the STC pool message.

It is another goal of the present invention to detect network delay changes so as to enable the required management for bit rate and complexity value buffers. Accordingly, a new Phase Locked Loop (PLL) algorithm is described here. The new algorithm is capable of cancelling the effects of network jitter significantly and locking to the master frequency faster. This algorithm is based on averaging the network delay over time and then using the growth seen in the network delays on the encoder side to estimate the difference between the encoder's frequency and that of the master clock (In this case multiplexer's clock).

This algorithm uses different stages to lock faster. At initial stages we need to find the direction of changes as fast as possible. The accuracy of the PLL drift value is not of critical importance here. As time passes the differences grow enough to estimate the value of PLL drift more accurately. Initial simulations indicate that this algorithm reaches the master frequency faster with less overshoots.

The relationship between values of the encoder's multiplexing clock (y) and multiplexer's clock (x) at the time $j^{th}$ PLL message is sent is given by the following equation:

$$y_j = m \cdot x_j + h$$

where:
$m = f_s / f_m$
$f_s$: The encoder's multiplexing clock frequency
$f_m$: The multiplexer's clock frequency
The value of the encoder's mux clock when the message is received at encoder is:

$$r_j = y_j + N + j_j$$

where N is the upstream network delay and $j_j$ is the $j^{th}$ network jitter value. The network delay seen by the encoder is:

$$r_j - x_j = y_j + N + j_j - x_j = m \cdot x_j + h + N + j_j - x_j = (m-1) \cdot x_j + h + N + j_j$$

The average of last K+1 network delays is:

$$a_i = \frac{\sum_{j=i-K}^{i} r_j - x_j}{K+1}$$

$$= \frac{\sum_{j=i-K}^{i} [(m-1) \cdot x_j + h + N + j_j]}{K+1}$$

$$= \frac{(K+1)(h+N) + (m-1) \cdot \sum_{j=i-K}^{i} x_j + \sum_{j=i-K}^{i} j_j}{K+1}$$

By replacing:

$$x_j = x_0 + j \cdot T$$

where T is the period used by multiplexer to send PLL messages and assuming:

$$\sum_{j=i-K}^{i} j_j \sim 0$$

we will have:

$$a_i = (m-1)(x_0 + i \cdot T + K \cdot T/2) + N + h$$

The difference between the $i^{th}$ and $j^{th}$ average is:

$$a_i - a_j = (m-1) \cdot T \cdot (i-j)$$

$$m = 1 + (a_i - a_j)/[T \cdot (i-j)] = 1 + (a_i - a_j)/(x_i - x_j)$$

$$f_s/f_m = (x_i - x_j + a_i - a_j)/(x_i - x_j)$$

The frequency of the encoder's PLL is given by:

$$f_p = f_s + (d/2^{40}) \cdot f_s = f_s \cdot [1 + (d/2^{40})]$$

where d is the value in the Drift register.

$$f_s/f_p = 1/[1 + (d/2^{40})]$$

by setting $f_p = f_m$ we will have:

$$1/[1+)(d/2^{40})] = (x_i - x_j + a_i - a_j)/(x_i - x_j)$$

Solving for d:

$$d = -[(a_i - a_j) \cdot 2^{40}]/(x_i - x_j + a_i - a_j)$$

As we can see this equation is independent of network delay and (almost) network jitter.

At startup the encoder simply listens to the PLL messages from mux and calculates the average of K+1 network delays. After having K+1 messages, we initialize the PLL value with: xi+ai. Where xi is the value of the mux clock in the $i^{th}$ received message and ai is the average of last K+1 network delays at that time.

To calculate the Drift register value, the encoder calculates the average of the last K+1 network delays at two different times i and j. The accuracy of the calculated Drift register value improves as the difference between i and j grows. At startup, this difference is small in order to start moving to the right direction as soon as possible. As time passes, the difference between i and j is increased to get a better estimation of the difference between the frequencies and therefore a better value for the Drift register. With higher network jitter values, the simulated PLL software shows that averaging the drift register values can result in more stable PLL frequency.

After running this algorithm for a few hours, we will have the average of values for the drift register. At this time we can add the drift register value to a data base. This data base is a lookup table of drift registers and mux's Mac addresses. The next time the PPL starts, the encoder can look up the initial drift value from this database. The encoder keeps updating the database periodically as long as the network delay is stable.

A change in the network delay can be detected immediately by comparing the delay for each message to the calculated average network delays. When a change in the network delay is detected, this algorithm stops updating the drift value, and restarts calculation of its average network delays. Therefore the PLL continues with current drift value until we have a stable network delay.

The detected change in the network delay is also reported to the video multiplexer controller on the encoder. The video multiplexer controller uses this information to decide if it should send the complexities earlier or later. In this algorithm the PLL does not try to compensate for the extra phase difference between encoder's PLL and mux's clock by slewing the frequency.

The invention claimed is:

1. A method of video statistical multiplexing for a system having a multiplexer and one or more video encoders communicating over a network subject to delay changes and packet loss, comprising:

at the one or more video encoders, determining video complexity information for a plurality of pictures of video data for (a) current time period and (b) a plurality of future time periods;

prorating the video complexity information with respect to a time interval used by the multiplexer to obtain prorated video complexity information and assigning a complexity index to groups of prorated video complexity information based on the time interval used by the multiplexer, wherein the time interval used by the multiplexer is independent of an inherent video interval used by the one or more video encoders;

communicating, to the multiplexer, the prorated video complexity information and the complexity indexes using a timing scheme that considers a delay of the network;

at the multiplexer, upon receiving the prorated video complexity information, adding the prorated video complexity information to an ordered complexity queue in an order based, at least in part, according to the complexity indexes;

the multiplexer determining, for each of a set of time intervals, a bit rate based, at least in part, on the prorated video complexity information;

communicating, from the multiplexer to the one or more video encoders over the network, the bit rate and timing information for the set of time intervals;

prorating the bit rate for the set of time intervals to obtain picture bit rates for use by the one or more video encoders to encode a set of pictures in the plurality of pictures, wherein the set of time intervals used by the multiplexer are independent of the inherent video interval used by the one or more video encoders; and the one or more video encoders assigning timestamps to transport stream packets carrying the encoded set of pictures to be sent to the multiplexer based on (a) the timing information received from the multiplexer and (b) a current picture bit rate.

2. The method of claim 1, further comprising synchronizing clocks of the one or more video encoders with a clock of the multiplexer.

3. The method of claim 2, further comprising:
detecting and measuring network delay changes; and
adjusting system timing based on the network delay changes.

4. The method of claim 1, further comprising:
using the prorated video complexity information received by the multiplexer to generate an estimated bit rate in response to determining that other video complexity information is either delayed or lost as a result of network communication events.

5. The method of claim 1, further comprising:
the one or more video encoders determining that the bit rate and the timing information for a particular future time period is either late or lost, estimating a bit rate using the prorated video complexity information and estimated video complexity information for the particular future time period.

6. The method of claim 1, wherein the one or more video encoders determine the video complexity information and the multiplexer determines the bit rates during a time that the system is adapting to a change in delay of the network.

7. The method of claim 1, further comprising:
each of the one or more video encoders using timing information contained in one or more received system time clock (STC) messages to calculate the delay in the network, a network jitter, and a frequency difference between the multiplexer's clock and the clocks of the one or more video encoders.

8. The method of claim 1, wherein the time interval used by the multiplexer is independent of at least one of frames and field intervals of the video data.

9. The method of claim 1, further comprising:
tracking, by the one or more video encoders, a clock of the multiplexer.

10. A statistical video multiplexing system, comprising:
a multiplexer and one or more video encoders communicating over a network subject to delay changes and packet loss, wherein:
each of the one or more video encoders prorating the video complexity information with respect to a time interval used by the multiplexer to obtain prorated video complexity information and assigning a complexity index to groups of prorated video complexity information based on the time interval used by the multiplexer, wherein the time interval used by the multiplexer is independent of an inherent video interval used by the one or more video encoders,
each of the one or more video encoders communicating, to the multiplexer, the prorated video complexity information and the complexity indexes using a timing scheme that considers a delay of the network;
at the multiplexer, upon receiving the prorated video complexity information, adding the prorated video complexity information to an ordered complexity queue in an order based, at least in part, according to the complexity indexes;
the multiplexer allocates a bit rate for a specified time period for each encoder, and sends bit rate messages to the one or more video encoders over the network, the bit rate messages including an allocated bit rate and timing information for the specific time period;
each of the one or more video encoders receives the bit rate message, encode the video stream to generate an encoded video stream based on the allocated bit rates specified by the received bit rate message, assign timestamps to transport stream packets based on the timing information specified by the bit rate messages, and send the encoded video stream to the multiplexer over the network;
the multiplexer sends the timing information in system time clock (STC) messages to the one or more video encoders; and
each of the one or more video encoders receives the STC messages and use the timing information contained therein to calculate a network delay, network jitter, and a frequency difference between a clock of a particular video encoder and a clock of the multiplexer.

11. The system of claim 10, wherein the system detects network delay changes and use the detected network delay changes to adjust system timing information.

12. A non-transitory computer readable storage medium storing one or more sequences of instructions, which when executed by one or more processors, cause:
at one or more video encoders, determining video complexity information for a plurality of pictures of video data for (a) a current time period and (b) a plurality of future time periods;
prorating the video complexity information with respect to a time interval used by a multiplexer to obtain prorated video complexity information and assigning a complexity index to groups of prorated video complexity information based on the time interval used by the multiplexer, wherein the time interval used by the multiplexer is independent of an inherent video interval used by the one or more video encoders;
communicating, to the multiplexer, the prorated video complexity information and the complexity indexes using a timing scheme that considers a delay of a network;
at the multiplexer, upon receiving the prorated video complexity information, adding the prorated video complexity information to an ordered complexity queue in an order based, at least in part, according to the complexity indexes;
the multiplexer determining, for each of a set of time intervals used by the multiplexer, a bit rate based, at least in part, on the prorated video complexity information;
communicating, from the multiplexer to the one or more video encoders over the network, the bit rate and timing information for the set of time intervals used by the multiplexer;
prorating the bit rate for the set of time intervals used by the multiplexer to obtain picture bit rates for use by the one or more video encoders to encode a set of pictures in the plurality of pictures; and
the one or more video encoders assigning timestamps to transport stream packets carrying the encoded set of pictures to be sent to the multiplexer based on (a) the timing information received from the multiplexer and (b) a current picture bit rate.

13. The non-transitory computer readable storage medium of claim 12, wherein execution of the one or more sequences of instructions further causes synchronizing clocks of the one or more video encoders with a clock of the multiplexer.

14. The non-transitory computer readable storage medium of claim 13, wherein execution of the one or more sequences of instructions further causes:
detecting and measuring network delay changes; and
adjusting system timing based on the network delay changes.

15. The non-transitory computer readable storage medium of claim 12, wherein execution of the one or more sequences of instructions further causes:
using the prorated video complexity information received by the multiplexer to generate an estimated bit rate in response to determining that other video complexity information is either delayed or lost as a result of network communication events.

16. The non-transitory computer readable storage medium of claim 12, wherein execution of the one or more sequences of instructions further causes:
the one or more video encoders determining that the bit rate and the timing information for a particular future time period is either late or lost, estimating a bit rate using the prorated video complexity information and estimated video complexity information for the particular future time period.

17. The non-transitory computer readable storage medium of claim 12, wherein the one or more video encoders determine the video complexity information and the multiplexer determines the bit rates during a time that the system is adapting to a change in delay of the network.

18. The non-transitory computer readable storage medium of claim 12, wherein execution of the one or more sequences of instructions further causes:
each of the one or more video encoders using timing information contained in one or more received system time clock (STC) messages to calculate the delay in the network, a network jitter, and a frequency difference between the multiplexer's clock and the clocks of the one or more video encoders.

19. The non-transitory computer readable storage medium of claim 12, wherein the time interval used by the multiplexer is independent of frames and field intervals of the video data.

20. The non-transitory computer readable storage medium of claim 12, wherein execution of the one or more sequences of instructions further causes:
   tracking, by the one or more video encoders, a clock of the multiplexer.

21. The non-transitory computer readable storage medium of claim 12, wherein the one or more video encoders, in response to detecting a change in conditions of the network, adjust the timing information and maintain the same picture bit rate while encoding the video data.

22. A non-transitory computer readable storage medium storing one or more sequences of instructions, which when executed by one or more processors, cause:
   at one or more video encoders, determining video complexity information for a plurality of pictures of video data for (a) a current time period and (b) a plurality of future time periods;
   prorating the video complexity information with respect to a time interval used by a multiplexer to obtain prorated video complexity information and assigning a complexity index to groups of prorated video complexity information based on the time interval used by the multiplexer, wherein the time interval used by the multiplexer is independent of an inherent video interval used by the one or more video encoders;
   communicating, to the multiplexer, the prorated video complexity information and the complexity indexes using a timing scheme that considers a delay of a network;
   the one or more video encoders receiving, over the network from the multiplexer, a bit rate and timing information for each of the plurality of time periods;
   prorating the bit rate for a set of time intervals used by the multiplexer to obtain picture bit rates for use by the one or more video encoders to encode a set of pictures in the plurality of pictures,
   wherein the picture bit rate is determined based on the video complexity information; and
   the one or more video encoders assigning timestamps to transport stream packets carrying the encoded set of pictures to be sent to the multiplexer based on (a) the timing information and (b) a current picture bit rate.

* * * * *